United States Patent
Zhu et al.

(10) Patent No.: US 11,909,524 B2
(45) Date of Patent: Feb. 20, 2024

(54) CODED RADIO LINK CONTROL RETRANSMISSION

(71) Applicant: QUALCOMM Incorporated, San Diego, CA (US)

(72) Inventors: Xipeng Zhu, San Diego, CA (US); Xiaoxia Zhang, San Diego, CA (US); Prasad Reddy Kadiri, San Diego, CA (US); Gavin Bernard Horn, La Jolla, CA (US); Alberto Rico Alvarino, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/076,734

(22) Filed: Oct. 21, 2020

(65) Prior Publication Data
US 2021/0119732 A1    Apr. 22, 2021

Related U.S. Application Data

(60) Provisional application No. 62/924,603, filed on Oct. 22, 2019.

(51) Int. Cl.
*H04L 1/00* (2006.01)
*H04W 4/06* (2009.01)
*H04L 1/22* (2006.01)
*H04L 1/08* (2006.01)

(52) U.S. Cl.
CPC .......... *H04L 1/0045* (2013.01); *H04L 1/0042* (2013.01); *H04L 1/08* (2013.01); *H04L 1/22* (2013.01); *H04W 4/06* (2013.01)

(58) Field of Classification Search
CPC ....... H04L 1/0045; H04L 1/0042; H04L 1/08; H04L 1/22; H04W 4/06
See application file for complete search history.

(56) References Cited

U.S. PATENT DOCUMENTS

| 2011/0154146 A1 | 6/2011 | Shin et al. |
| 2016/0142939 A1 | 5/2016 | Yi et al. |

(Continued)

FOREIGN PATENT DOCUMENTS

| CN | 102546142 B | 8/2016 |
| CN | 108476098 A | 8/2018 |

(Continued)

OTHER PUBLICATIONS

3GPP, Technical Specification Group Radio Access Network; Medium Access Control (MAC) Protocol Specification, Release 15, Jun. 2018, 3GPP Organizational Partners, 213 pgs.

(Continued)

*Primary Examiner* — Jackie Zuniga Abad
(74) *Attorney, Agent, or Firm* — Holland & Hart LLP

(57) ABSTRACT

Methods, systems, and devices for wireless communications are described. Generally, the described techniques provide for efficiently retransmitting radio link control (RLC) protocol data units (PDUs) to one or more UEs. When a user equipment (UE) fails to receive or decode an RLC PDU transmitted by a base station, the UE may transmit a status PDU to the base station indicating that the UE failed to receive or decode the RLC PDU. The base station may receive the status PDU from the UE, and the base station may generate a repair PDU that includes redundant bits of the lost PDU (e.g., the PDU that the UE failed to receive or decode). The base station may then transmit the repair PDU to the UE, and the UE may use the redundant bits in the repair PDU (e.g., in combination with buffered PDUs) to attempt to correctly decode the lost PDU.

24 Claims, 16 Drawing Sheets

(56) References Cited

U.S. PATENT DOCUMENTS

| | | | |
|---|---|---|---|
| 2016/0170439 A1 | 6/2016 | Aweya | |
| 2016/0323062 A1* | 11/2016 | Yang | H04W 28/0289 |
| 2017/0041100 A1* | 2/2017 | Xie | H04L 1/00 |
| 2017/0064707 A1 | 3/2017 | Xiao et al. | |
| 2017/0214489 A1 | 7/2017 | Jiang et al. | |
| 2018/0132279 A1 | 5/2018 | Yi et al. | |
| 2018/0192088 A1* | 7/2018 | Martin | H04N 21/41407 |
| 2019/0253921 A1* | 8/2019 | Shin | H04L 1/12 |

FOREIGN PATENT DOCUMENTS

| | | |
|---|---|---|
| WO | WO-2011019427 A2 | 2/2011 |
| WO | WO-2016176841 | 11/2016 |
| WO | WO-2017035727 A1 | 3/2017 |

OTHER PUBLICATIONS

Han J., et al., "Practical Considerations in the Design and Implementation of Time Synchronization Systems using IEEE 1588", IEEE Communications Magazine, IEEE Service Center, Piscataway, US, vol. 47, No. 11, Nov. 1, 2009 (Nov. 1, 2009), pp. 164-170, XP011284169, ISSN: 0163-6804, DOI: 10.11 09/MCOM.2009.5307481.

International Search Report and Written Opinion—PCT/US2020/056839—ISA/EPO—Feb. 4, 2021.

\* cited by examiner

CODED RADIO LINK CONTROL RETRANSMISSION

CROSS REFERENCE

The present application for patent claims the benefit of U.S. Provisional Patent Application No. 62/924,603 by ZHU et al., entitled "CODED RADIO LINK CONTROL RETRANSMISSION," filed Oct. 22, 2019, assigned to the assignee hereof, and expressly incorporated by reference herein.

BACKGROUND

The following relates generally to wireless communications and more specifically to coded radio link control (RLC) retransmission.

Wireless communications systems are widely deployed to provide various types of communication content such as voice, video, packet data, messaging, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless systems, a base station may not support the retransmission of certain types of data. Techniques for retransmitting certain types of data and improvements thereof, however, may be desirable in some wireless systems.

SUMMARY

The described techniques relate to improved methods, systems, devices, and apparatuses that support coded radio link control (RLC) retransmission. Generally, the described techniques provide for efficiently facilitating error correction at an RLC layer for broadcast transmissions (e.g., used in addition to, or as an alternative to, error correction schemes at a physical layer). In particular, the described techniques provide for efficiently retransmitting RLC protocol data units (PDUs) to one or more user equipment (UEs). In accordance with the techniques described herein, when a UE fails to receive or decode an RLC PDU broadcast or multi-cast by a base station, the UE may transmit a status PDU to the base station indicating that the UE failed to receive or decode the RLC PDU.

The base station may receive the status PDU from the UE, in addition to other status PDUs from other UEs, and the base station may generate a repair PDU that includes redundant bits of all lost PDUs (e.g., the PDUs that the UEs failed to receive or decode). The base station may then broadcast the repair PDU to the UEs, and the UEs may use the redundant bits in the repair PDU (e.g., in combination with buffered PDUs) to attempt to correctly decode lost PDUs. Because the base station may broadcast the repair PDU with redundant bits of the lost PDUs rather than broadcasting each of the lost PDUs separately, the retransmission overhead may be reduced. In some cases, the base station may also support the transmission of a repair PDU with redundant bits of lost PDUs for unicast transmissions to a UE to allow the UE to correctly decode lost PDUs.

A method of wireless communication at a UE is described. The method may include identifying that the UE failed to receive or decode a PDU scheduled to be transmitted by a base station in a broadcast or unicast transmission, transmitting, to the base station, a status PDU indicating that the UE failed to receive or decode the PDU, and receiving, from the base station and responsive to the status PDU, a repair PDU including redundant bits of the PDU.

An apparatus for wireless communication at a UE is described. The apparatus may include a processor, memory coupled with the processor, and instructions stored in the memory. The instructions may be executable by the processor to cause the apparatus to identify that the UE failed to receive or decode a PDU scheduled to be transmitted by a base station in a broadcast or unicast transmission, transmit, to the base station, a status PDU indicating that the UE failed to receive or decode the PDU, and receive, from the base station and responsive to the status PDU, a repair PDU including redundant bits of the PDU.

Another apparatus for wireless communication at a UE is described. The apparatus may include means for identifying that the UE failed to receive or decode a PDU scheduled to be transmitted by a base station in a broadcast or unicast transmission, transmitting, to the base station, a status PDU indicating that the UE failed to receive or decode the PDU, and receiving, from the base station and responsive to the status PDU, a repair PDU including redundant bits of the PDU.

A non-transitory computer-readable medium storing code for wireless communication at a UE is described. The code may include instructions executable by a processor to identify that the UE failed to receive or decode a PDU scheduled to be transmitted by a base station in a broadcast or unicast transmission, transmit, to the base station, a status PDU indicating that the UE failed to receive or decode the PDU, and receive, from the base station and responsive to the status PDU, a repair PDU including redundant bits of the PDU.

Some examples of the method, apparatuses, and non-transitory computer-readable medium described herein may further include operations, features, means, or instructions for processing the repair PDU at either an RLC layer or a packet data convergence protocol layer. In some examples of the method, apparatuses, and non-transitory computer-readable medium described herein, receiving the repair PDU may include operations, features, means, or instructions for receiving the repair PDU via either a broadcast or multicast transmission, wherein the repair PDU includes redundant bits for the UE and for a plurality of other UEs. In some examples of the method, apparatuses, and non-transitory computer-readable medium described herein, the repair PDU is associated with a multicast radio bearer.

Some examples of the method, apparatuses, and non-transitory computer-readable medium described herein may further include operations, features, means, or instructions for storing at least one correctly decoded PDU in a buffer at the UE, and combining the at least one correctly decoded PDU with the redundant bits of the PDU in an attempt to decode at least the PDU that the UE failed to receive or decode. Some examples of the method, apparatuses, and non-transitory computer-readable medium described herein may further include operations, features, means, or instructions for receiving radio resource control signaling indicating a maximum number of PDUs or bytes that the UE may be configured to store in the buffer. Some examples of the method, apparatuses, and non-transitory computer-readable medium described herein may further include operations, features, means, or instructions for receiving radio resource control signaling indicating a forward error correction encoder used to generate the redundant bits included in the repair PDU.

Some examples of the method, apparatuses, and non-transitory computer-readable medium described herein may further include operations, features, means, or instructions for successfully decoding the PDU using buffered PDUs and the redundant bits of the PDU included in the repair PDU, and transmitting another status PDU indicating that the UE successfully decoded the PDU. Some examples of the method, apparatuses, and non-transitory computer-readable medium described herein may further include operations, features, means, or instructions for advancing a window of the buffered PDUs based on successfully decoding the PDU, where the advancing includes dropping a PDU with a lowest sequence number from a buffer and adding the successfully decoded PDU to the buffer.

Some examples of the method, apparatuses, and non-transitory computer-readable medium described herein may further include operations, features, means, or instructions for identifying that the UE failed to decode the PDU using buffered PDUs and the redundant bits of the PDU included in the repair PDU, transmitting another status PDU indicating that the UE failed to decode the PDU, and receiving another repair PDU including additional redundant bits of the PDU based on transmitting the other status PDU. In some examples of the method, apparatuses, and non-transitory computer-readable medium described herein, the repair PDU includes redundant bits of a set of PDUs including the PDU that the UE failed to receive or decode, and the set of PDUs may be for one or more UEs including the UE.

Some examples of the method, apparatuses, and non-transitory computer-readable medium described herein may further include operations, features, means, or instructions for determining a sequence number of the PDU that the UE failed to receive or decode, and identifying the redundant bits of the PDU from the repair PDU based on the sequence number. In some examples of the method, apparatuses, and non-transitory computer-readable medium described herein, the repair PDU indicates a range of sequence numbers of the set of PDUs for which redundant bits may be included in the repair PDU. In some examples of the method, apparatuses, and non-transitory computer-readable medium described herein, the UE may be operating in a acknowledged mode, a forward error correction mode, or a broadcast mode.

In some examples of the method, apparatuses, and non-transitory computer-readable medium described herein, the repair PDU includes a control PDU or a data PDU. In some examples of the method, apparatuses, and non-transitory computer-readable medium described herein, the PDU comprises an RLC PDU and the status PDU comprises an RLC status PDU. In some examples of the method, apparatuses, and non-transitory computer-readable medium described herein, the PDU comprises a packet data convergence protocol PDU and the status PDU comprises a packet data convergence protocol status report.

A method of wireless communication at a base station is described. The method may include generating, at a layer, a PDU for a broadcast or unicast transmission, transmitting the PDU in the broadcast or unicast transmission, receiving, from a UE, a status PDU indicating that the UE failed to receive or decode the PDU, and transmitting a repair PDU including redundant bits of the PDU based on receiving the status PDU.

An apparatus for wireless communication at a base station is described. The apparatus may include a processor, memory coupled with the processor, and instructions stored in the memory. The instructions may be executable by the processor to cause the apparatus to generate, at a layer, a PDU for a broadcast or unicast transmission, transmit the PDU in the broadcast or unicast transmission, receive, from a UE, a status PDU indicating that the UE failed to receive or decode the PDU, and transmit a repair PDU including redundant bits of the PDU based on receiving the status PDU.

Another apparatus for wireless communication at a base station is described. The apparatus may include means for generating, at a layer, a PDU for a broadcast or unicast transmission, transmitting the PDU in the broadcast or unicast transmission, receiving, from a UE, a status PDU indicating that the UE failed to receive or decode the PDU, and transmitting a repair PDU including redundant bits of the PDU based on receiving the status PDU.

A non-transitory computer-readable medium storing code for wireless communication at a base station is described. The code may include instructions executable by a processor to generate, at a layer, a PDU for a broadcast or unicast transmission, transmit the PDU in the broadcast or unicast transmission, receive, from a UE, a status PDU indicating that the UE failed to receive or decode the PDU, and transmit a repair PDU including redundant bits of the PDU based on receiving the status PDU.

Some examples of the method, apparatuses, and non-transitory computer-readable medium described herein may further include operations, features, means, or instructions for generating the repair PDU at either an RLC layer or a packet data convergence protocol layer. In some examples of the method, apparatuses, and non-transitory computer-readable medium described herein, transmitting the repair PDU may include operations, features, means, or instructions for transmitting the repair PDU via either a broadcast or multicast transmission, wherein the repair PDU includes redundant bits for the UE and for a plurality of other UEs. In some examples of the method, apparatuses, and non-transitory computer-readable medium described herein, the repair PDU is associated with a multicast radio bearer.

In some examples of the method, apparatuses, and non-transitory computer-readable medium described herein, receiving the status PDU may include operations, features, means, or instructions for receiving, from a set of UEs including the UE, a set of status PDUs indicating that the set of UEs failed to receive or decode a set of PDUs, where the repair PDU includes redundant bits of the set of PDUs. Some examples of the method, apparatuses, and non-transitory computer-readable medium described herein may further include operations, features, means, or instructions for transmitting, in the repair PDU, an indication of a range of sequence numbers of the set of PDUs for which redundant bits may be included in the repair PDU.

Some examples of the method, apparatuses, and non-transitory computer-readable medium described herein may further include operations, features, means, or instructions for transmitting, to the UE, radio resource control signaling indicating a maximum number of PDUs or bytes that the UE may be configured to store in a buffer. Some examples of the method, apparatuses, and non-transitory computer-readable medium described herein may further include operations, features, means, or instructions for determining the maximum number of PDUs or bytes that the UE may be configured to store in the buffer based on a delay budget, a forward error correction capability of the UE, a size of the buffer at the UE, or a combination thereof.

Some examples of the method, apparatuses, and non-transitory computer-readable medium described herein may further include operations, features, means, or instructions for generating the redundant bits of the PDU using a forward error correction encoder. Some examples of the method, apparatuses, and non-transitory computer-readable medium described herein may further include operations, features, means, or instructions for transmitting, to the UE, radio resource control signaling indicating the forward error correction encoder used to generate the redundant bits included in the repair PDU.

Some examples of the method, apparatuses, and non-transitory computer-readable medium described herein may further include operations, features, means, or instructions for receiving another status PDU indicating that the UE successfully decoded the PDU using the redundant bits of the PDU included in the repair PDU. Some examples of the method, apparatuses, and non-transitory computer-readable medium described herein may further include operations, features, means, or instructions for receiving another status PDU indicating that the UE failed to decode the PDU using the redundant bits of the PDU included in the repair PDU, and transmitting another repair PDU including additional redundant bits of the PDU based on receiving the other status PDU.

In some examples of the method, apparatuses, and non-transitory computer-readable medium described herein, transmitting the PDU may include operations, features, means, or instructions for unicasting the PDU to the UE or broadcasting a set of PDUs to be received by a set of UEs, the set of PDUs including the protocol data to be received by the UE. In some examples of the method, apparatuses, and non-transitory computer-readable medium described herein, transmitting the repair PDU may include operations, features, means, or instructions for unicasting the repair PDU to the UE or broadcasting the repair PDU to be received by a set of UEs including the UE.

Some examples of the method, apparatuses, and non-transitory computer-readable medium described herein may further include operations, features, means, or instructions for identifying that the base station received a set of status PDUs from the set of UEs indicating that the set of UEs failed to receive or decode a set of PDUs, and broadcasting the repair PDU to be received by the set of UEs based on the identifying. Some examples of the method, apparatuses, and non-transitory computer-readable medium described herein may further include operations, features, means, or instructions for identifying that the base station received the status PDU from the UE and that the base station failed to receive other status PDUs from other UEs, and unicasting the repair PDU to the UE based on the identifying.

In some examples of the method, apparatuses, and non-transitory computer-readable medium described herein, the repair PDU includes a control PDU or a data PDU. In some examples of the method, apparatuses, and non-transitory computer-readable medium described herein, the PDU comprises an RLC PDU and the status PDU comprises an RLC status PDU. In some examples of the method, apparatuses, and non-transitory computer-readable medium described herein, the PDU comprises a packet data convergence protocol PDU and the status PDU comprises a packet data convergence protocol status report.

DETAILED DESCRIPTION

Figure 1:
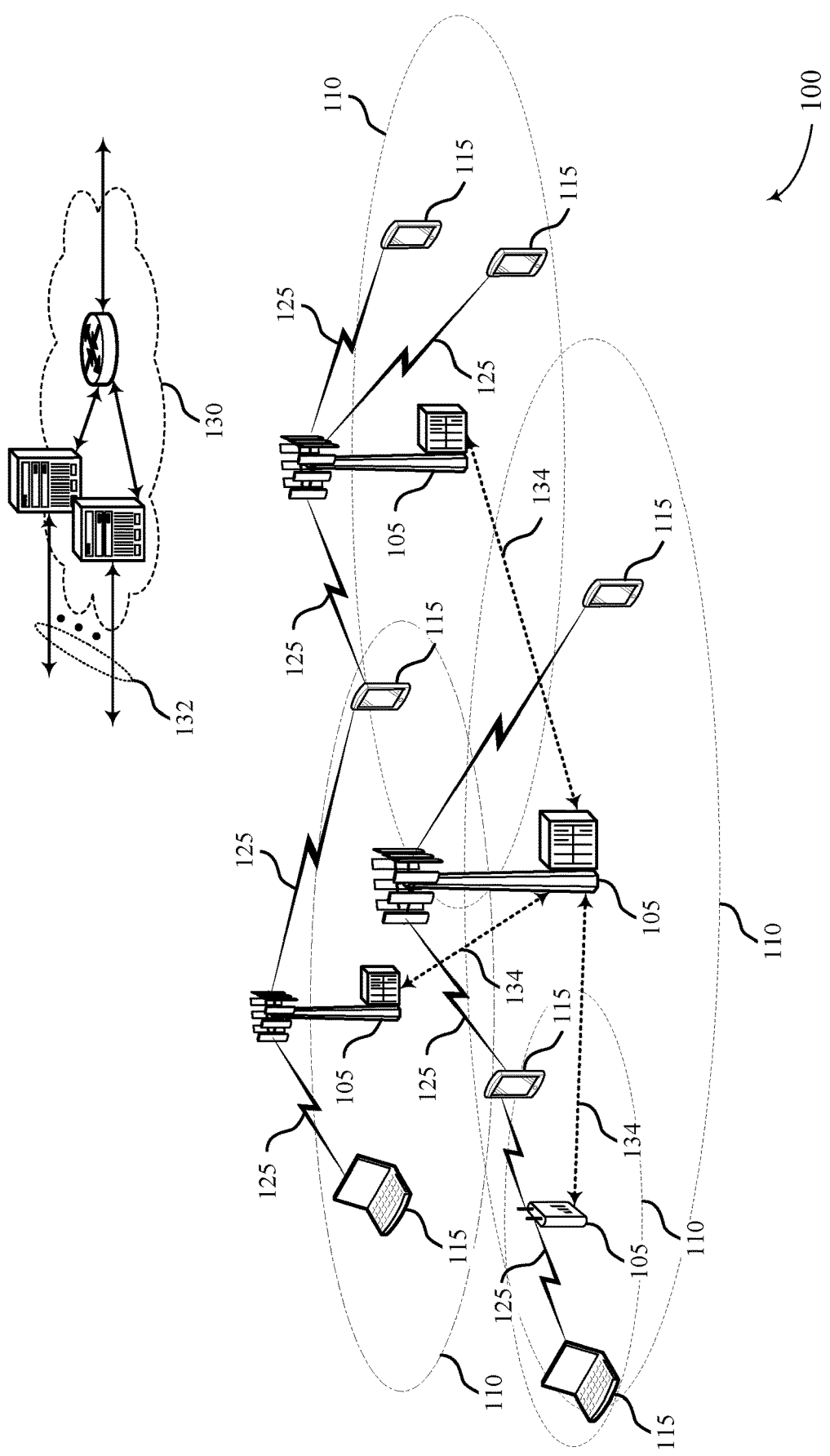
FIG. 1 illustrates an example of a wireless communications system that supports coded RLC retransmission in accordance with aspects of the present disclosure.

Some wireless communications systems may support broadcast or multicast services, where a base station may transmit signals for reception by a group of user equipment (UE). In some cases, a base station may support multicast or broadcast services (e.g., multimedia broadcast multicast services (MBMS)), where the base station may transmit signals for reception by multiple UEs. In some wireless systems (e.g., a Long-Term Evolution (LTE) system), a base station may not support the retransmission of broadcast or multicast data in a radio access network (RAN). In other systems (e.g., a fifth generation (5G) system), however, a base station may support the retransmission of broadcast or multicast data in a RAN to facilitate higher reliability and lower latency. In accordance with some aspects of the present disclosure, to improve reliability and latency, a wireless communications system (e.g., a 5G systems) may support error correction schemes for broadcast or multicast transmissions. For instance, at a physical layer, a base station and a UE may support a hybrid automatic repeat request (HARM) scheme, where a UE may report feedback indicating whether data broadcast by the base station was successfully received and decoded at the physical layer, and, if the UE failed to receive or decode the data, the base station may rebroadcast the data to the UE.

In some cases, it may not be efficient to correct all errors at low layers (e.g., the physical layer). Thus, a base station and a UE may also support an error correction scheme at a radio link control (RLC) layer. Such an error correction scheme may be referred to as RLC acknowledged mode (AM) and may be used to correct the residual errors of lower layers. Using RLC AM, a base station may retransmit RLC protocol data units (PDUs) to UEs that failed to receive or decode the RLC PDUs. In some cases, however, if a base station broadcasts multiple RLC PDUs to a group of UEs, and different UEs fail to receive or decode different PDUs, the number of PDUs that the base station would be configured to rebroadcast would be high, resulting in high overhead in a wireless system.

As described herein, a wireless communications system may support efficient techniques for facilitating error correction at an RLC layer for broadcast transmissions with limited overhead. In particular, the described techniques provide for efficiently retransmitting RLC PDUs to one or more UEs. In accordance with the techniques described herein, when a UE fails to receive or decode an RLC PDU broadcast by a base station, the UE may transmit a status PDU to the base station indicating that the UE failed to receive or decode the RLC PDU. The base station may receive the status PDU from the UE, in addition to other status PDUs from other UEs, and the base station may generate a repair PDU that includes redundant bits of all lost PDUs (e.g., the PDUs that the UEs failed to receive or decode). The base station may then broadcast the repair PDU to the UEs, and the UEs may use the redundant bits in the repair PDU (e.g., in combination with buffered PDUs) to attempt to correctly decode lost PDUs.

Aspects of the disclosure introduced above are initially described in the context of a wireless communications system. Examples of processes and signaling exchanges that support coded RLC retransmission are then described. Aspects of the disclosure are further illustrated by and described with reference to apparatus diagrams, system diagrams, and flowcharts that relate to coded RLC retransmission.

FIG. 1 illustrates an example of a wireless communications system 100 that supports coded RLC retransmission in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Figure 2:
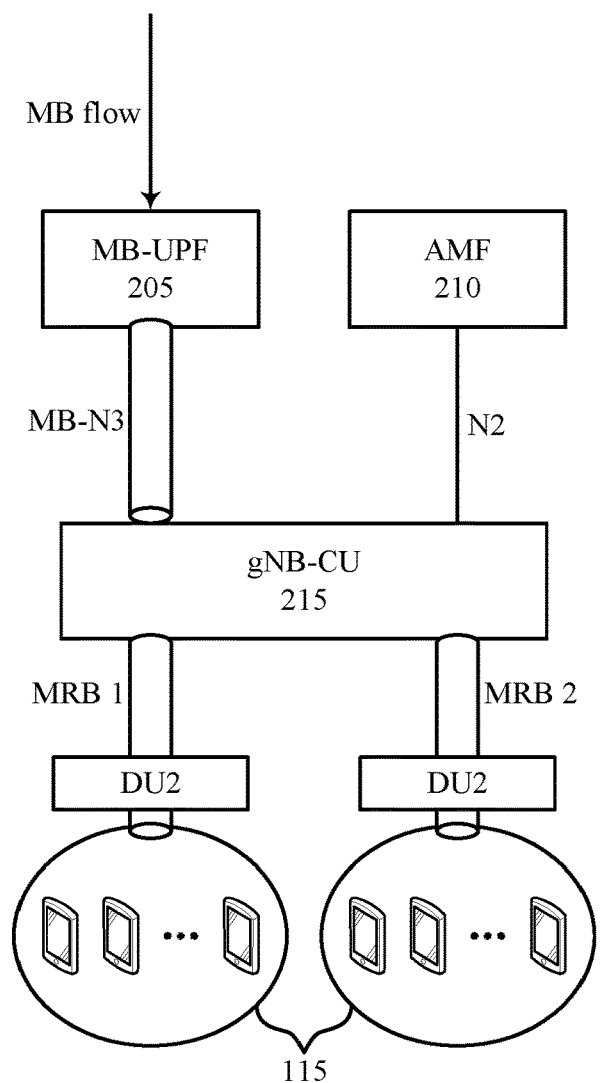
FIG. 2 illustrates an example of the flow of broadcast data from a base station to user equipment (UEs) in accordance with aspects of the present disclosure.

Wireless communications system 100 may support broadcast or multicast services, where a base station 105 may transmit signals for reception by a group of UEs 115. FIG. 2 illustrates an example of the flow of broadcast data 200 from a base station 105 to UEs 115 in accordance with aspects of the present disclosure. In the example of FIG. 2, a multicast broadcast (MB) user plane function (UPF) 205 may receive an MB quality of service (QoS) flow and may pass the MB flow over an MB-N3 tunnel to a base station control unit (CU) 215. MB-N3 may be a user plane interface for MB flow delivery over a general packet radio service (GPRS) tunneling protocol (GTP) (e.g., a tunneling protocol over the user data plane (UDP) or IP). The base station CU 215 may also receive control signaling for MB flow setup and modification over an N2 interface from an access and mobility management function (AMF) 210. The base station CU 215 may then map the MB flow to multicast radio bearers (MRBs) or dedicated radio bearers (DRBs) for transmission to UEs 115. In some cases, broadcast transmissions may be mixed with unicast transmissions in a PDSCH. That is, there may be close synergy between broadcast and unicast transmissions, including flexible switching between a DRB and MRB, and unicast assistance to MRB in lower layers.

In some wireless systems (e.g., LTE systems), a base station may not support retransmission of broadcast data in a radio access network (RAN). One example of LTE broadcast is single cell point to multipoint (SC-PTM), where a single cell may broadcast signals over a PDSCH to a group of UEs, and the PDSCH may be identified by the group of UEs based on a group radio network temporary identifier (G-RNTI) associated with the broadcast signals. In other systems (e.g., 5G systems), to improve reliability and latency, a base station 105 may support the retransmission of broadcast data. In one example, a base station 105 and one or more UEs 115 may use a HARQ scheme to facilitate retransmissions of HARQ data. In some cases, however, it may not be efficient to correct all errors at low layers (e.g., the physical layer). Thus, a base station 105 and a UE 115 may also support an error correction scheme at an RLC layer. Such an error correction scheme may be referred to as RLC AM and may be used to correct the residual errors of lower layers. For instance, the packet error rate (PER) of a single physical transmission without retransmission may be approximately 0.1, the PER using HARQ in the physical or MAC layer may be approximately 0.0001~0.001, and the PER using RLC AM may be 0~0.000001.

Using RLC AM, a base station 105 may retransmit RLC PDUs (e.g., packets generated at an RLC layer) to UEs 115 that failed to receive or decode the RLC PDUs. RLC AM may be a procedure used for unicast transmissions that may be adapted for broadcast transmissions. A UE 115 may transmit an RLC status report over a unicast transmission (e.g., with a cell RNTI (C-RNTI)), and a base station 105 may retransmit lost PDUs over either broadcast (e.g., with a G-RNTI) or unicast (e.g., with a C-RNTI). In some cases, the sliding window-based flow control may be reused (e.g., to determine which PDUs to retransmit). In conventional RLC AM, a base station 105 may store the same PDU sent for transmission in a retransmission buffer, and, if a UE 115 fails to decode the PDU, the base station 105 may transmit the same PDU transmitted earlier. In some cases, however, if a base station 105 broadcasts multiple RLC PDUs to a group of UEs 115, and different UEs 115 fail to receive or decode different PDUs, the number of PDUs that the base station would be configured to rebroadcast would be high, resulting in high overhead in a wireless system.

Figure 3:
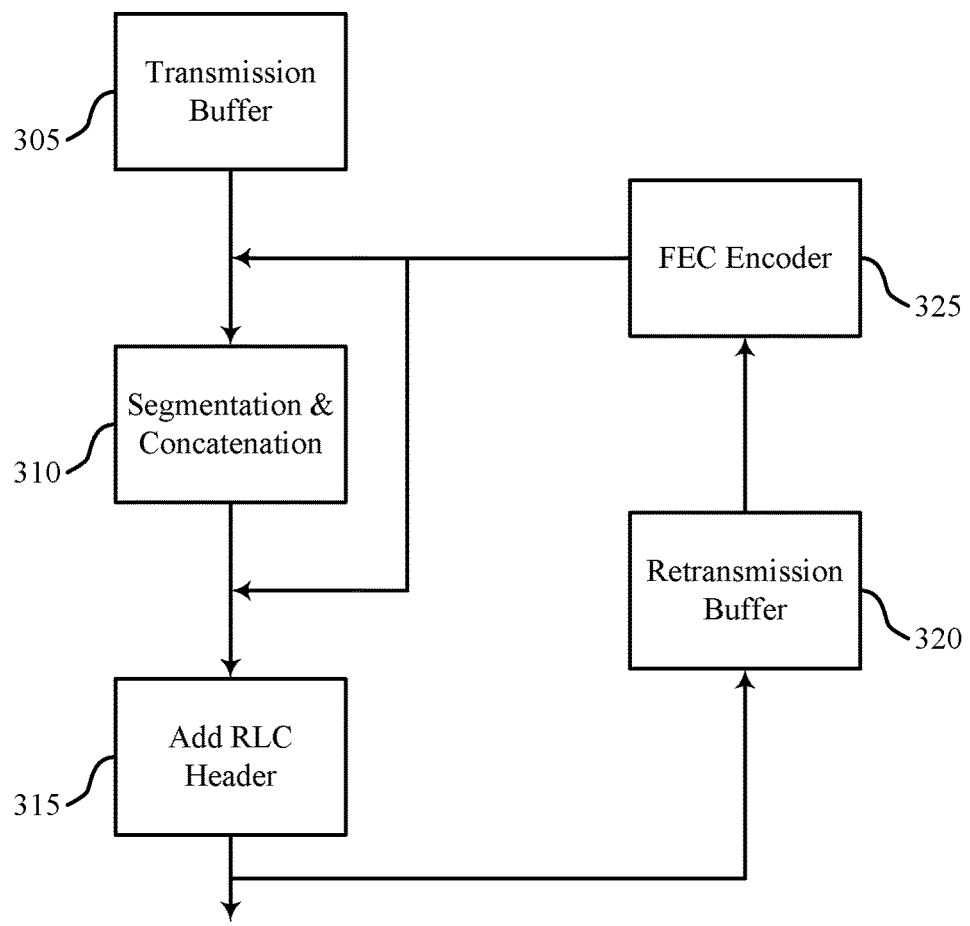
FIG. 3 illustrates an example of a flowchart of operations performed at a radio link control (RLC) layer to facilitate error correction for broadcast transmissions in accordance with aspects of the present disclosure.

Wireless communications system 100 may support efficient techniques for facilitating error correction at an RLC layer for broadcast transmissions with limited overhead. FIG. 3 illustrates an example of a flowchart 300 of operations performed at an RLC layer to facilitate error correction for broadcast transmissions in accordance with aspects of the present disclosure. At 305, an RLC layer at a base station 105 may buffer one or more packets for transmission. At 310, the RLC layer may perform segmentation and concatenation to generate packets with appropriate sizes, and, at 315, the RLC layer may add an RLC header to each packet to generate one or more RLC PDUs. The RLC PDUs may then be passed to lower layers for transmission, and, at 320, the RLC PDUs may be stored in a retransmission buffer.

If the base station 105 receives an indication that one or more UEs 115 failed to receive one or more RLC PDUs, instead of retransmitting the RLC PDUs stored in the retransmission buffer, the RLC layer 105 may generate redundant bits of each of the RLC PDUs for transmission in a repair PDU. Specifically, at 325, the RLC layer may encode each RLC PDU stored in the retransmission buffer to generate redundant bits of the RLC PDU, and the RLC layer may add the redundant bits to a repair PDU and pass the repair PDU to lower layers for transmission. Because the base station 105 may broadcast the repair PDU with redundant bits of one or more lost PDUs, rather than broadcasting each of the lost PDUs separately, the retransmission overhead may be reduced. That is, for an MRB to be received by multiple UEs 115, retransmitting a repair PDU generated by an outer encoder may be more efficient than directly retransmitting the lost PDUs.

As an example, as illustrated in FIG. 3, a UE A, UE B, and UE C may all be scheduled to receive broadcast data on an MRB, and UE A may miss (e.g., fail to receive or decode) PDU 1, UE B may miss PDU 2, and UE C may miss PDU K. In this example, if a base station 105 supports conventional techniques for RLC AM, the base station 105 may be configured to retransmit PDU 1, PDU 2, and PDU K such that these PDUs may be successfully received at UE A, UE B, and UE C. As a result, the overhead associated with broadcast retransmissions may be high. Using the techniques described herein, however, the base station 105 may generate a repair PDU with redundant bits of each of PDU 1, PDU 2, and PDU K, and the base station 105 may broadcast the repair PDU to UE A, UE B, and UE C. Because the repair PDU may include redundant bits of each of the PDUs, each UE may be able to successfully decode the PDU that the UE originally failed to receive or decode. Further, because the redundant bits may be included in a single PDU, the overhead associated with transmitting the repair PDU may be limited.

Figure 4:
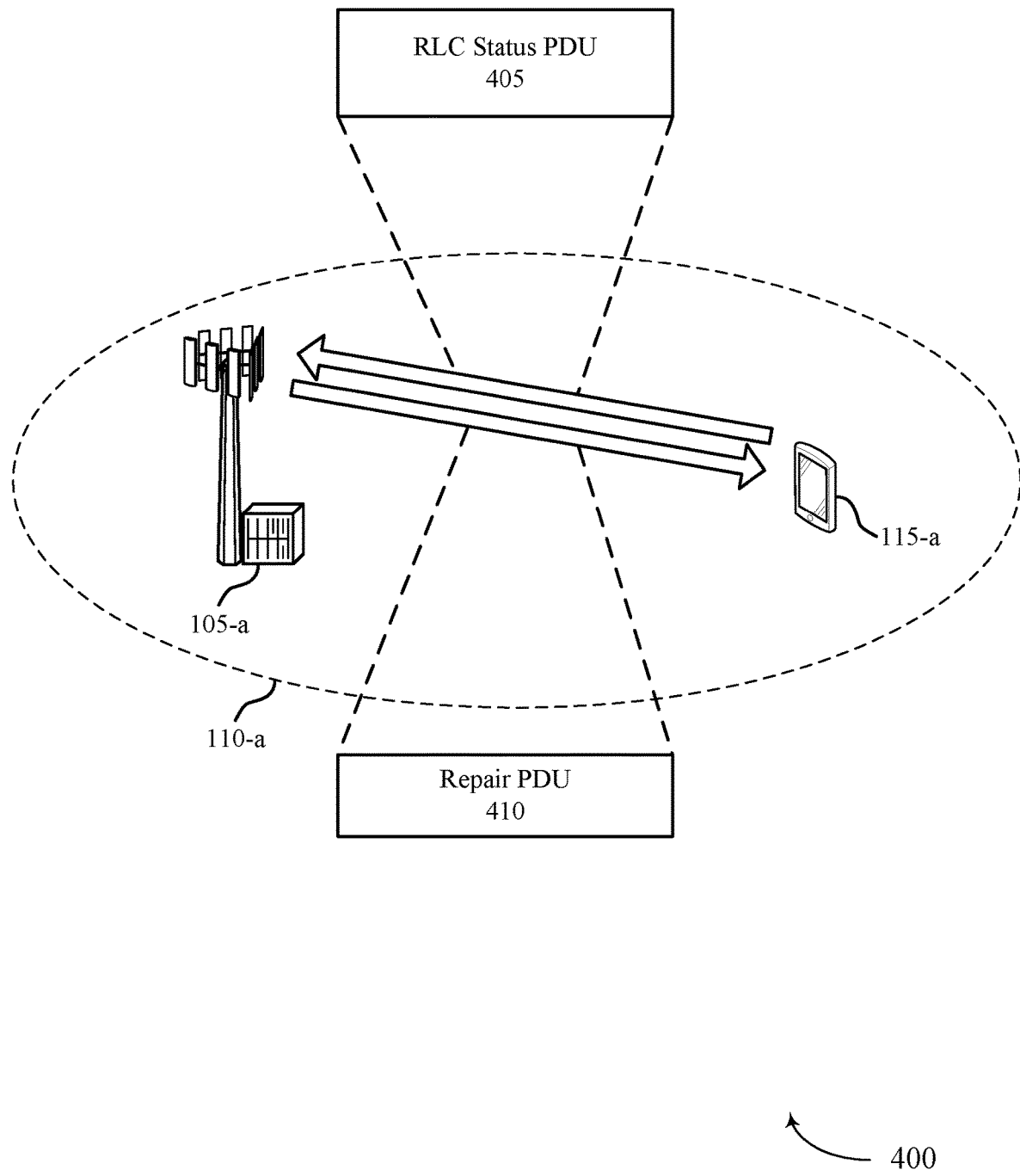
FIG. 4 illustrates an example of a wireless communications system that supports coded RLC retransmission in accordance with aspects of the present disclosure.

FIG. 4 illustrates an example of a wireless communications system 400 that supports coded RLC retransmission in accordance with aspects of the present disclosure. Wireless communications system includes UE 115-*a*, which may be an example of a UE 115 described with reference to FIGS. 1-3. Wireless communications system 400 also includes base station 105-*a*, which may be an example of a base station 105 described with reference to FIGS. 1-3. Base station 105-*a* may provide communication coverage for a coverage area 110-*a*. Wireless communications system 400 may implement aspects of wireless communications system 100. For example, wireless communications system 400 may support efficient techniques for facilitating error correction at an RLC layer for broadcast transmissions with limited overhead.

In the example of FIG. 4, base station 105-*a* may transmit an RLC PDU to UE 115-*a* in a broadcast or unicast transmission, and UE 115-*a* may fail to receive or decode the RLC PDU (i.e., the PDU may be lost). UE 115-*a* may then transmit an RLC status PDU 405 to base station 105-*a* indicating that UE 115-*a* failed to receive or decode the RLC PDU. Base station 105-*a* may receive the RLC status PDU 405 from UE 115-*a*, in addition to other RLC status PDUs from other UEs 115, and base station 105-*a* may transmit a repair PDU 410 with redundant bits of the RLC PDUs that UE 115-*a* and the other UEs 115 failed to receive or decode (e.g., the base station 105-*a* may broadcast the repair PDU based on feedback from multiple UEs 115). The use of the repair PDU 410 for transmitting redundant bits to UEs 115 may be referred to as per packet group automatic repeat request (ARQ) for higher retransmission efficiency. Further, the PDUs that the UE 115-*a* and the other UEs 115 failed to receive or decode may be referred to as lost PDUs. Base station 105-*a* may transmit the repair PDU (e.g., instead of all the individual PDUs) to benefit (e.g., provide redundant bits for) all the lost PDUs of all the UEs.

UE 115-*a* may receive the repair PDU 410 and may identify the redundant bits of the lost RLC PDU that the UE 115-*a* failed to receive or decode. In some cases, UE 115-*a* may identify the sequence number of the lost RLC PDU, and the redundant bits of the lost RLC PDU in the repair PDU 410 may be associated with the sequence number of the lost PDU. For instance, the redundant bits of the lost RLC PDU may include a header that indicates the sequence number of the lost PDU. In such cases, UE 115-*a* may identify the redundant bits of the lost RLC PDU that the UE 115-*a* failed to receive or decode based on the sequence number of the lost RLC PDU. UE 115-*a* may then use the redundant bits of the lost RLC PDU to attempt to correctly decode the lost RLC PDU. For instance, UE 115-*a* may be configured to buffer up to a threshold number (K) of RLC PDUs (e.g., even after the RLC PDUs are submitted to upper layers), and UE 115-*a* may combine the redundant bits of the lost RLC PDU with the buffered PDUs to attempt to decode the lost RLC PDU.

Figure 5:
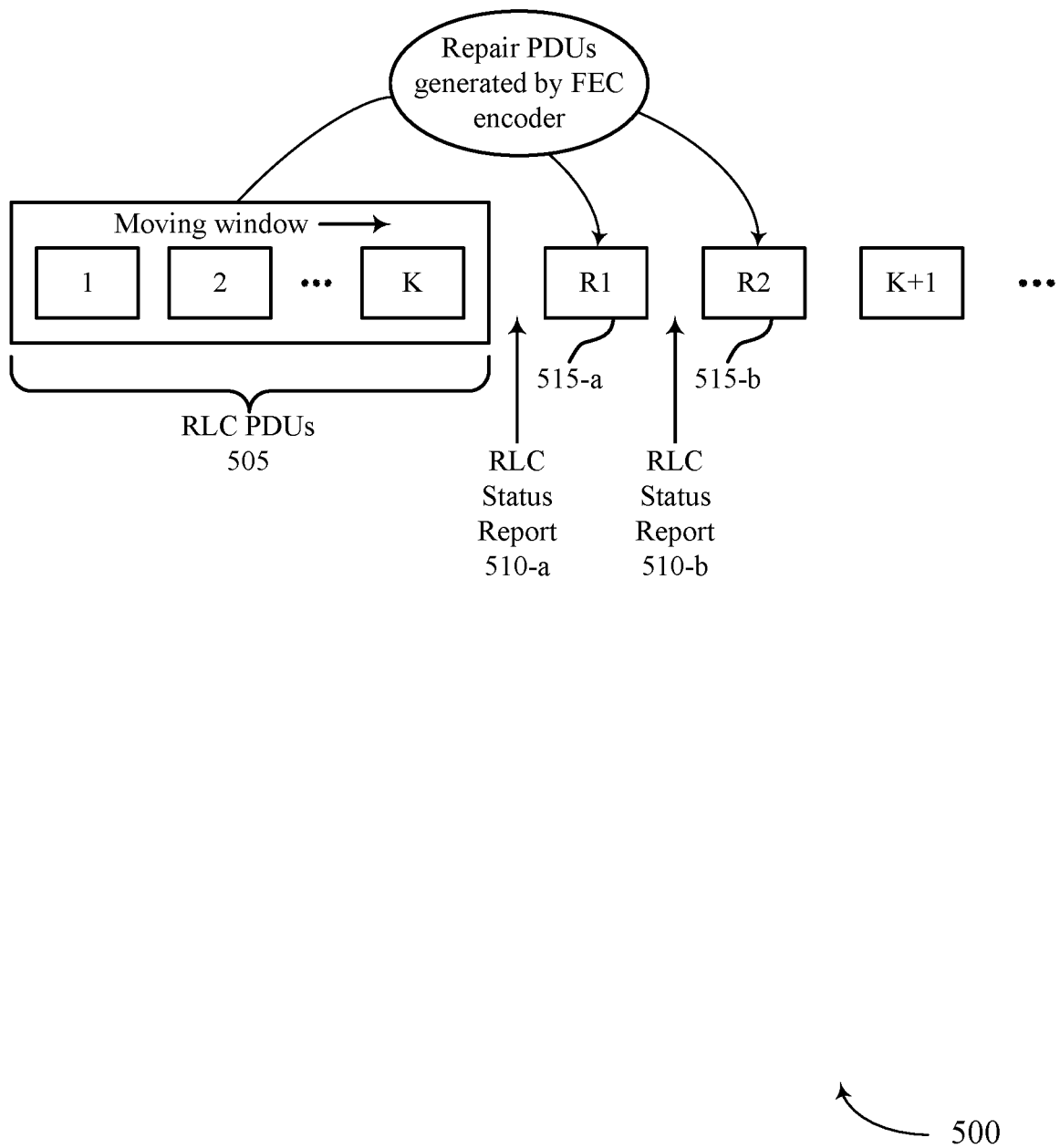
FIG. 5 illustrates an example of an error correction scheme at an RLC layer that supports coded RLC retransmission in accordance with aspects of the present disclosure.

FIG. 5 illustrates an example of an error correction scheme 500 at an RLC layer that supports coded RLC retransmission in accordance with aspects of the present disclosure. In the example of FIG. 5, a base station 105 may transmit RLC PDUs 505 to one or more UEs 115. The base station 105 may then receive an RLC status report 510-*a* indicating that some or all of the one or more UEs 115 failed to receive or decode the RLC PDUs 505. Thus, base station 105-*a* may generate and transmit a repair PDU 515-*a* to the one or more UEs that includes redundant bits of the RLC PDUs 505. The repair PDU 515-*a* may indicate a range of sequence numbers of the RLC PDUs 505 (e.g., a list of RLC PDUs 505) for which redundant bits are included in the repair PDU 515-*a*. That is, the repair PDU 515-*a* may include the sequence number range of source PDUs used to generate the repair PDU 515-*a*.

The range of sequence numbers of the RLC PDUs 505 may correspond to a window (e.g., moving window) of RLC PDUs, and the repair PDU 515-*a* may include redundant bits for a subset of the RLC PDUs in the window or all RLC PDUs in the window. The window of RLC PDUs 505 for which redundant bits are included in the repair PDU 515-*a* may be referred to as a receiving window. Further, the receiving window may be used in the RLC AM mode described with reference to FIG. 1 and may be maintained at the base station 105 and at each UE 115. In some cases, in addition to, or as an alternative to, indicating the sequence number range, the repair PDU 515-*a* may indicate a sequence offset range. The repair PDU 515-*a* may also include a sequence number to identify the repair PDU 515-*a* in the event that multiple repair PDUs are transmitted (e.g., the repair PDU sequence number).

As described with reference to FIG. 4, a UE 115 may receive the repair PDU 515-*a* and may decode lost RLC PDUs from buffered PDUs and redundant bits of the lost RLC PDUs in the repair PDU 515-*a*. The buffered PDUs may be successfully decoded RLC PDUs (e.g., with sequence numbers preceding or surrounding the sequence number of a lost RLC PDU), and the range of buffered PDUs may correspond to a window of RLC PDUs. The window of RLC PDUs used to decode lost PDUs may be referred to as a buffering window and may be different from the receiving window described above. Thus, UE received repair packets may be used to correct lost packets in the buffering window sequence number range. In some cases, the size of the buffering window (e.g., the number of RLC PDUs that the UE 115 is configured to store for decoding lost RLC PDUs) may be configured by a base station 105. For instance, the base station 105 may transmit RRC signaling to a UE 115 including a configuration (e.g., downlink RLC-AM configuration) that indicates the size of the buffering window. The configuration may be sent to the UE 115 as part of an MRB configuration.

In some cases, the base station 105 may indicate the size of the buffering window as the number of PDUs that the UE 115 may store in the buffer for decoding lost PDUs (e.g., fec-WindowPDUSize). In other cases, the base station 105 may indicate the size of the buffering window as the number of bytes that the UE 115 may store in the buffer for decoding lost PDUs (e.g., fec-WindowByteSize). The base station 105 may determine the size of the buffering window for a UE 115 based on a delay budget (e.g., where a longer buffering window is maintained for delay insensitive communications), an FEC capability of the UE 115, and an RLC buffer size at the UE. In some cases, the base station 105 may also include an indication of the FEC encoder used to generate the redundant bits in the repair PDU 515-*a* (i.e., fec-CodeStructure) in the configuration that indicates the size of the buffering window (or in another configuration transmitted to the UE 115). The indication of the FEC encoder may include the FEC code type and structure parameters.

If a UE 115 that received the repair PDU 515-*a* is able to successfully decode the lost PDUs 505, the UE 115 may advance a buffering window maintained at the UE 115 and may transmit an RLC status report that indicates that the lost PDUs 505 were successfully decoded. In some cases, a UE 115 may advance a buffering window by adding a number of RLC PDUs decoded using the redundant bits in the repair PDU 515-*a* to the buffer and dropping the same number of RLC PDUs with the lowest sequence numbers from the buffer. If, however, a UE 115 that received the repair PDU 515-*a* fails to decode a lost PDU, the UE 115 may transmit an RLC status report 510-*b* that indicates that the UE 115 failed to decode at least a subset of the lost PDUs 505. The base station 105 may then transmit another repair PDU 515-*b*, and the UE 115 may use the repair PDU 515-*b* to correctly decode lost PDUs.

Figure 6:
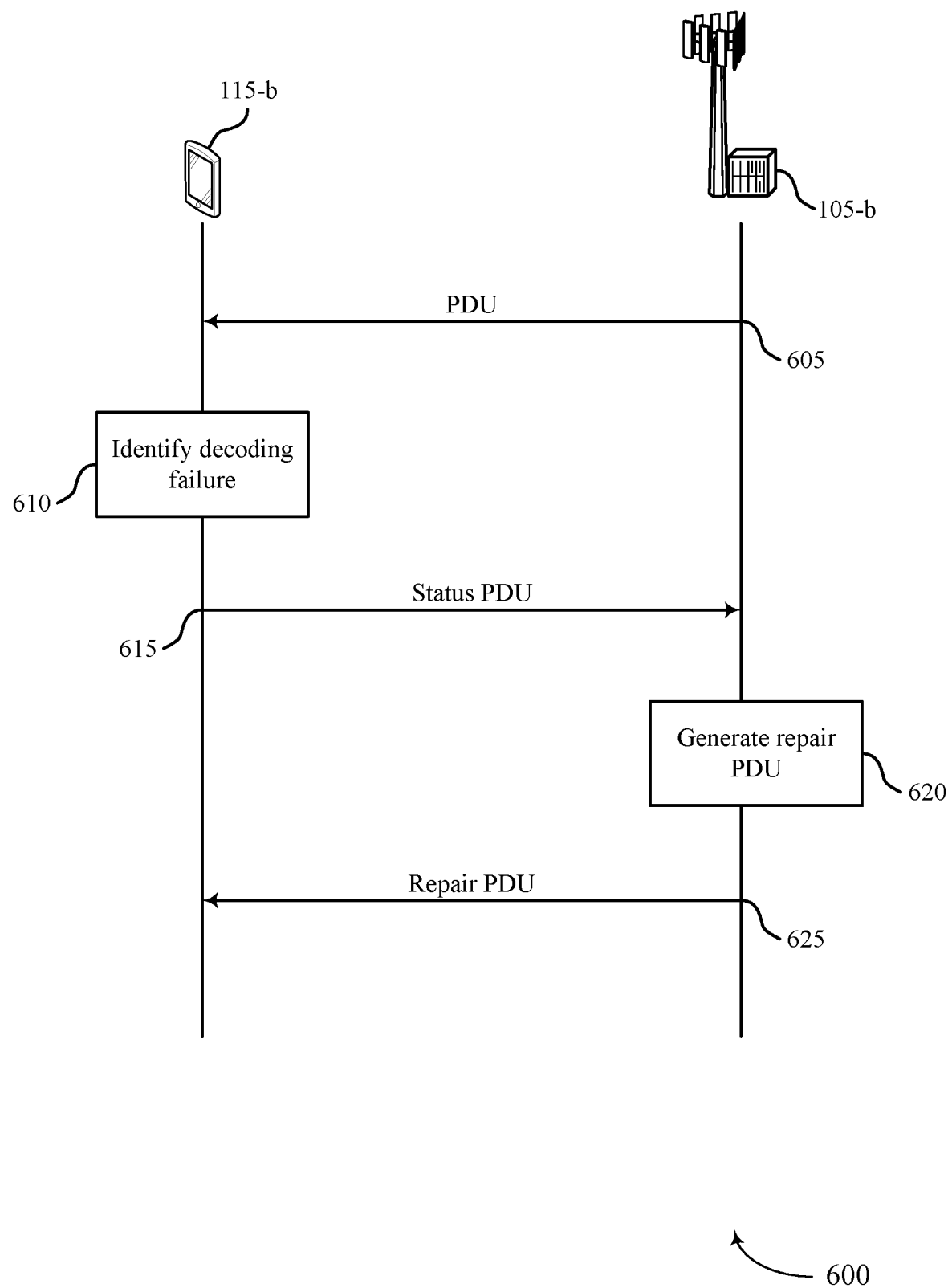
FIG. 6 illustrates an example of a process flow that supports coded RLC retransmission in accordance with aspects of the present disclosure.

FIG. 6 illustrates an example of a process flow 600 that supports coded RLC retransmission in accordance with aspects of the present disclosure. Process flow 600 illustrates aspects of techniques performed by a UE 115-*b*, which may be an example of a UE 115 described with reference to FIGS. 1-5. Process flow 600 illustrates aspects of techniques performed by a base station 105-*b*, which may be an example of a base station 105 described with reference to FIGS. 1-5. As described herein, process flow 600 may support efficient techniques for facilitating error correction at an RLC layer for broadcast transmissions with limited overhead. Such techniques may be referred to as RLC AM techniques, or RLC AM techniques evolved to support FEC coded retransmission as RLC FEC mode (RLC FM) or RLC broadcast mode (RLC BM).

At 605, base station 105-*b* may transmit an RLC PDU to a UE 115-*b* in a broadcast or unicast transmission. The RLC PDU may be generated at an RLC layer at the base station 105-*b* and may be further processed by lower layers at the base station 105-*b* before being transmitted to the UE 115-*b*. At 610, UE 115-*b* may identify that the UE 115-*b* failed to receive or decode the RLC PDU (e.g., scheduled to be transmitted by the base station 105-*b* in a broadcast or unicast transmission). At 615, UE 115-*b* may transmit an RLC status PDU indicating that the UE 115-*b* failed to receive or decode the RLC PDU. Because UE 115-*b* may fail to receive or decode the RLC PDU, the RLC PDU may be referred to as a lost RLC PDU.

At 620, base station 105-*b* may generate a repair PDU including redundant bits of the lost RLC PDU. Before transmitting the RLC PDU at 605, base station 105-*b* may store the RLC PDU in a retransmission buffer. Then, once base station 105-*b* receives the indication that UE 115-*b* failed to receive or decode the RLC PDU, base station 105-*b* may encode the RLC PDU to generate redundant bits to include in a repair PDU for transmission to UE 115-*b*. In some cases, the base station 105-*b* may use an FEC encoder (e.g., block code, fountain code, etc.) on the RLC PDU to generate the redundant bits of the RLC PDU to include in the repair PDU. At 625, base station 105-*b* may transmit the repair PDU including the redundant bits of the lost PDU in a broadcast or unicast transmission. In some cases, the repair PDU may be a control PDU or a data PDU (e.g., generated with the same format as a control PDU or a data PDU).

In some cases, if base station 105-*b* determines that an RLC status PDU was received from a single UE 115-*b*, and no RLC status PDUs were received from other UEs 115 (e.g., when the PDU at 605 is unicast to UE 115-*b*), base station 105-*b* may unicast the repair PDU to UE 115-*b* (e.g., including the redundant bits of the PDU at 605). In other cases, if base station 105-*b* determines that multiple RLC status PDUs were received from UE 115-*b* and other UEs 115 (e.g., when the PDU at 605 is broadcast with other PDUs to UE 115-*b* and the other UEs 115), base station 105-*b* may broadcast the repair PDU to UE 115-*b* and the other UEs 115 (e.g., including the redundant bits of the PDU at 605 and other PDUs that the other UEs 115 failed to receive or decode).

UE 115-*b* may receive the repair PDU and may attempt to decode the lost PDU using the redundant bits of the lost PDU in the repair PDU. In some cases, UE 115-*b* may store at least one correctly decoded RLC PDU in a buffer at the UE 115-*b*, and UE 115-*b* may combine the at least one correctly decoded RLC PDU with the redundant bits of the lost RLC PDU in an attempt to decode the lost RLC PDU. In some cases, the UE 115-*b* may successfully decode the lost RLC PDU using the buffered PDUs and the redundant bits of the lost PDU included in the repair PDU, and the UE 115-*b* may transmit another RLC status PDU to base station 105-*b* indicating that the UE 115-*b* successfully decoded the lost RLC PDU. In such cases, UE 115-*b* may advance a window of the buffered PDUs by dropping the RLC PDU with the lowest sequence number from the buffer and adding the newly, successfully decoded RLC PDU to the buffer.

In other cases, the UE 115-*b* may fail to decode the RLC PDU using the buffered PDUs and the redundant bits of the lost PDU included in the repair PDU, and the UE 115-*b* may transmit another RLC status PDU to base station 105-*b* indicating that the UE 115-*b* failed to decode the lost RLC PDU. In such cases, base station 105-*b* may transmit, and UE 115-*b* may receive, another repair PDU including additional redundant bits of the lost RLC PDU. The redundant bits of the lost PDU included in the repair PDU received at 625 and the redundant bits of the lost PDU included in the other (e.g., next) repair PDU may be the same or may be different. In some examples, after a threshold number of transmissions of a repair PDU with redundant bits of the lost PDU, the base station 105-*b* may avoid including redundant bits of the lost PDU in subsequent repair PDUs.

Although the techniques described herein are related to RLC retransmission, it is to be understood that, in some cases, similar techniques may be applied for retransmissions at other higher layers, such as at a PDCP layer. In such cases, a base station may transmit a PDCP PDU to a UE, and the UE may attempt to receive and decode the PDCP PDU. If the UE fails to receive or decode the PDCP PDU, the UE may transmit a PDCP status report to the base station indicating that the UE failed to receive or decode the PDCP PDU (e.g., indicating that the PDCP PDU is lost). The base station may then generate a repair PDU (e.g., a new PDCP control PDU) with redundant bits of the PDCP PDU that the UE failed to receive or decode and redundant bits of other PDCP PDUs that other UEs failed to receive or decode, and the base station may transmit the repair PDU (e.g., broadcast or unicast) to the UE or to the UE and the other UEs.

Figure 7:
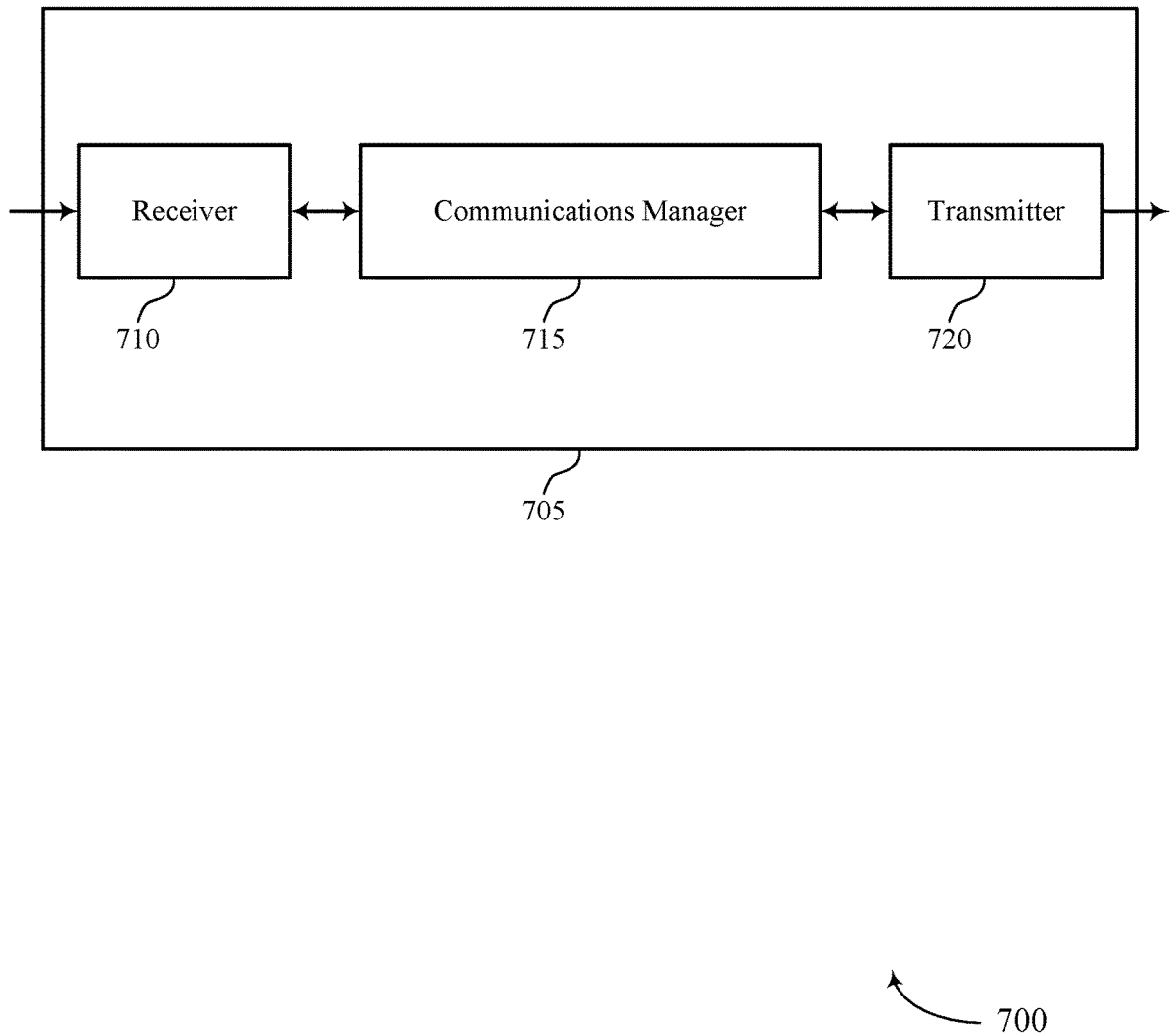
FIGS. 7 and 8 show block diagrams of devices that support coded RLC retransmission in accordance with aspects of the present disclosure.

FIG. 7 shows a block diagram 700 of a device 705 that supports coded RLC retransmission in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to coded RLC retransmission, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify that the UE failed to receive or decode a PDU scheduled to be transmitted by a base station in a broadcast or unicast transmission, transmit, to the base station, a status PDU indicating that the UE failed to receive or decode the PDU, and receive, from the base station and responsive to the status PDU, a repair PDU including redundant bits of the PDU. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a wireless device modem (e.g., a mobile device modem), and the receiver 710 and the transmitter 720 (or a transceiver module including the receiver 710 and the transmitter 720) may be implemented as analog components (e.g., amplifiers, filters, antennas) coupled with the wireless device modem to enable wireless transmission and reception over one or more radio frequency bands.

The communications manager 715 as described herein may be implemented to realize one or more potential advantages. In some implementations of the present disclosure, the communications manager 715 may experience a greater achievable throughput, increased spectral efficiency, and an increased likelihood for successful broadcast or multicast communications between the device 705 and a base station. Moreover, as a potential result of increased likelihood for successful communications between the device 705 and the base station, the communications manager 715 may spend less time performing computations or processing tasks associated with transmitting or receiving signals, which may enable the communications manager 715 (in full or in part, such as select sub-components) to utilize less power or to enter a sleep mode for longer durations or more frequently, which may increase the power savings and battery life of the communications manager 715 and/or the device 705 in general.

Figure 8:
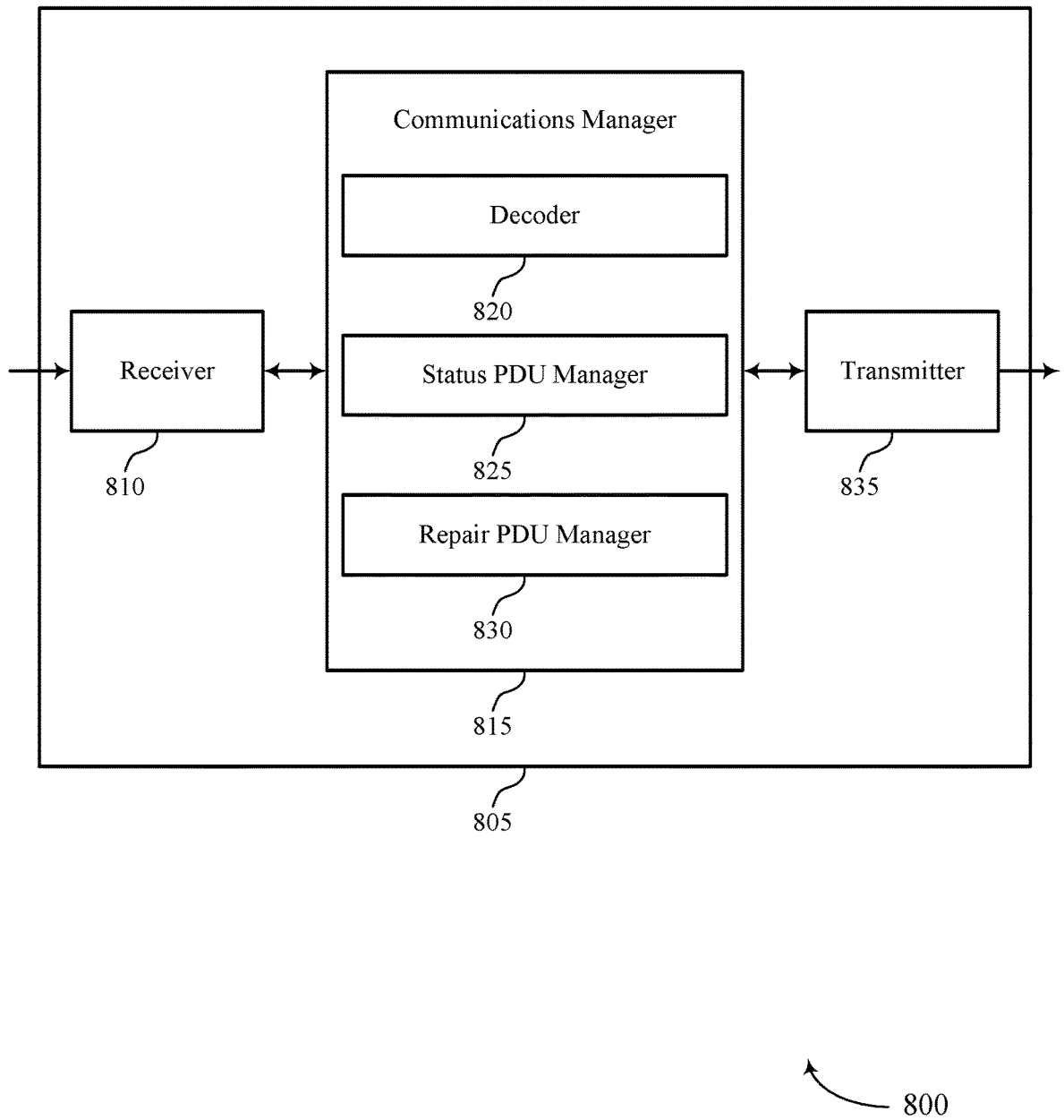

FIG. 8 shows a block diagram 800 of a device 805 that supports coded RLC retransmission in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to coded RLC retransmission, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a decoder 820, a status PDU manager 825, and a repair PDU manager 830. The communications manager 815 may be an example of aspects of the communications manager 1010 described herein.

The decoder 820 may identify that the UE failed to receive or decode a PDU scheduled to be transmitted by a base station in a broadcast or unicast transmission. The status PDU manager 825 may transmit, to the base station, a status PDU indicating that the UE failed to receive or decode the PDU. The repair PDU manager 830 may receive, from the base station and responsive to the status PDU, a repair PDU including redundant bits of the PDU.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
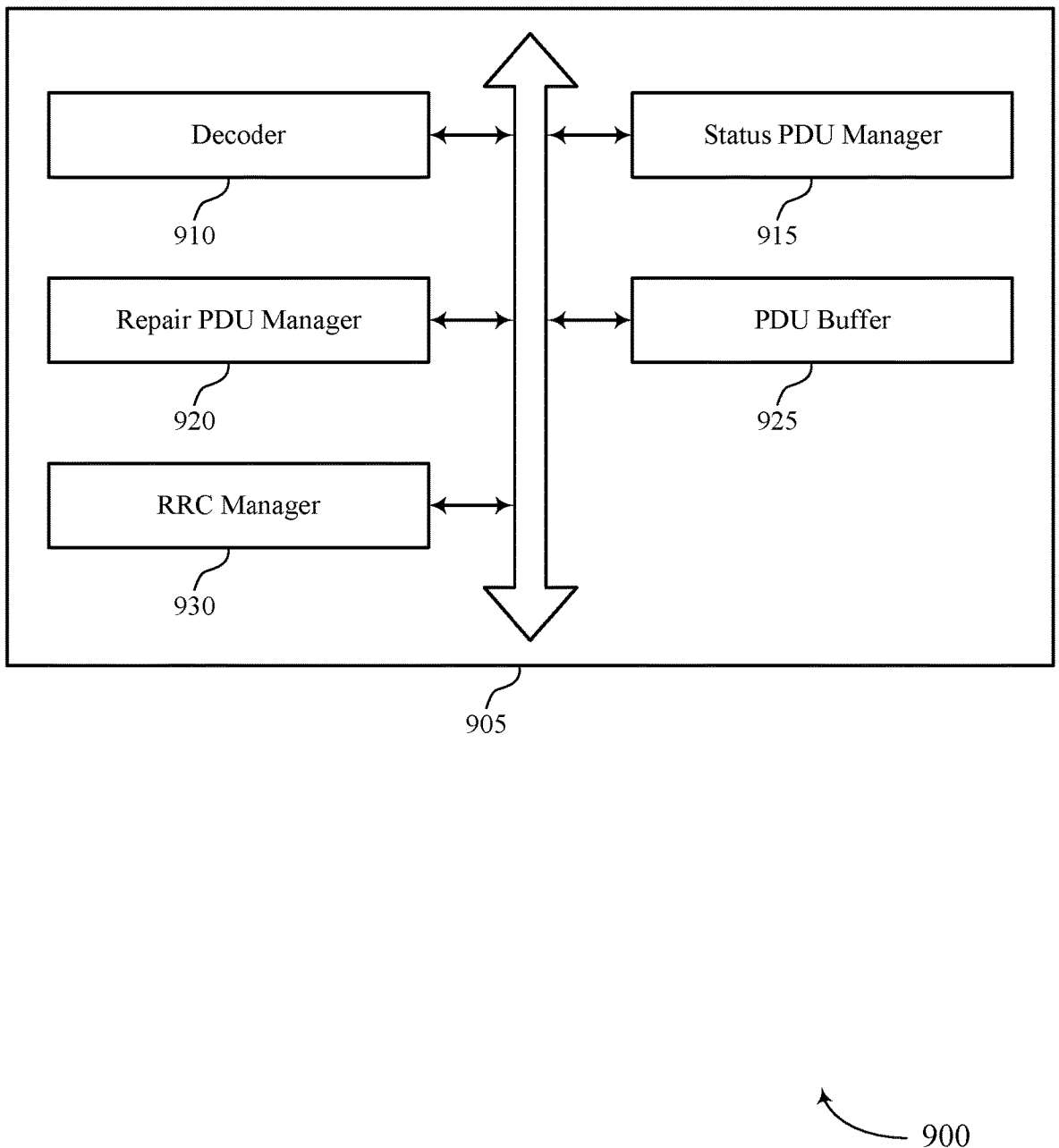
FIG. 9 shows a block diagram of a communications manager that supports coded RLC retransmission in accordance with aspects of the present disclosure.

FIG. 9 shows a block diagram 900 of a communications manager 905 that supports coded RLC retransmission in accordance with aspects of the present disclosure. The communications manager 905 may be an example of aspects of a communications manager 715, a communications manager 815, or a communications manager 1010 described herein. The communications manager 905 may include a decoder 910, a status PDU manager 915, a repair PDU manager 920, a PDU buffer 925, and a RRC manager 930. Each of these modules may communicate, directly or indirectly, with one another (e.g., via one or more buses).

The decoder 910 may identify that the UE failed to receive or decode a PDU scheduled to be transmitted by a base station in a broadcast or unicast transmission. The status PDU manager 915 may transmit, to the base station, a status PDU indicating that the UE failed to receive or decode the PDU. The repair PDU manager 920 may receive, from the base station and responsive to the status PDU, a repair PDU including redundant bits of the PDU.

The PDU buffer 925 may store at least one correctly decoded PDU in a buffer at the UE. In some examples, the decoder 910 may combine the at least one correctly decoded PDU with the redundant bits of the PDU in an attempt to decode at least the PDU that the UE failed to receive or decode. The RRC manager 930 may receive radio resource control signaling indicating a maximum number of PDUs or bytes that the UE is configured to store in the buffer. In some examples, the RRC manager 930 may receive radio resource control signaling indicating a forward error correction encoder used to generate the redundant bits included in the repair PDU.

In some examples, the decoder 910 may successfully decode the PDU using buffered PDUs and the redundant bits of the PDU included in the repair PDU. In some examples, the status PDU manager 915 may transmit another status PDU indicating that the UE successfully decoded the PDU. In some examples, the PDU buffer 925 may advance a window of the buffered PDUs based on successfully decoding the PDU, where the advancing includes dropping a PDU with a lowest sequence number from a buffer and adding the successfully decoded PDU to the buffer.

In some examples, the decoder 910 may identify that the UE failed to decode the PDU using buffered PDUs and the redundant bits of the PDU included in the repair PDU. In some examples, the status PDU manager 915 may transmit another status PDU indicating that the UE failed to decode the PDU. In some examples, the repair PDU manager 920 may receive another repair PDU including additional redundant bits of the PDU based on transmitting the other status PDU.

In some cases, the repair PDU includes redundant bits of a set of PDUs including the PDU that the UE failed to receive or decode. In some cases, the set of PDUs are for one or more UEs including the UE. In some examples, the repair PDU manager 920 may determine a sequence number of the PDU that the UE failed to receive or decode. In some examples, the repair PDU manager 920 may identify the redundant bits of the PDU from the repair PDU based on the sequence number. In some cases, the repair PDU indicates a range of sequence numbers of the set of PDUs for which redundant bits are included in the repair PDU. In some cases, the UE is operating in an RLC AM, an RLC FM, or an RLC BM. In some cases, the repair PDU includes a control PDU or a data PDU. In some cases, the PDU includes an RLC PDU and the status PDU includes an RLC status PDU. In some cases, the PDU includes a packet data convergence protocol PDU, and the status PDU includes a packet data convergence protocol status report.

Figure 10:
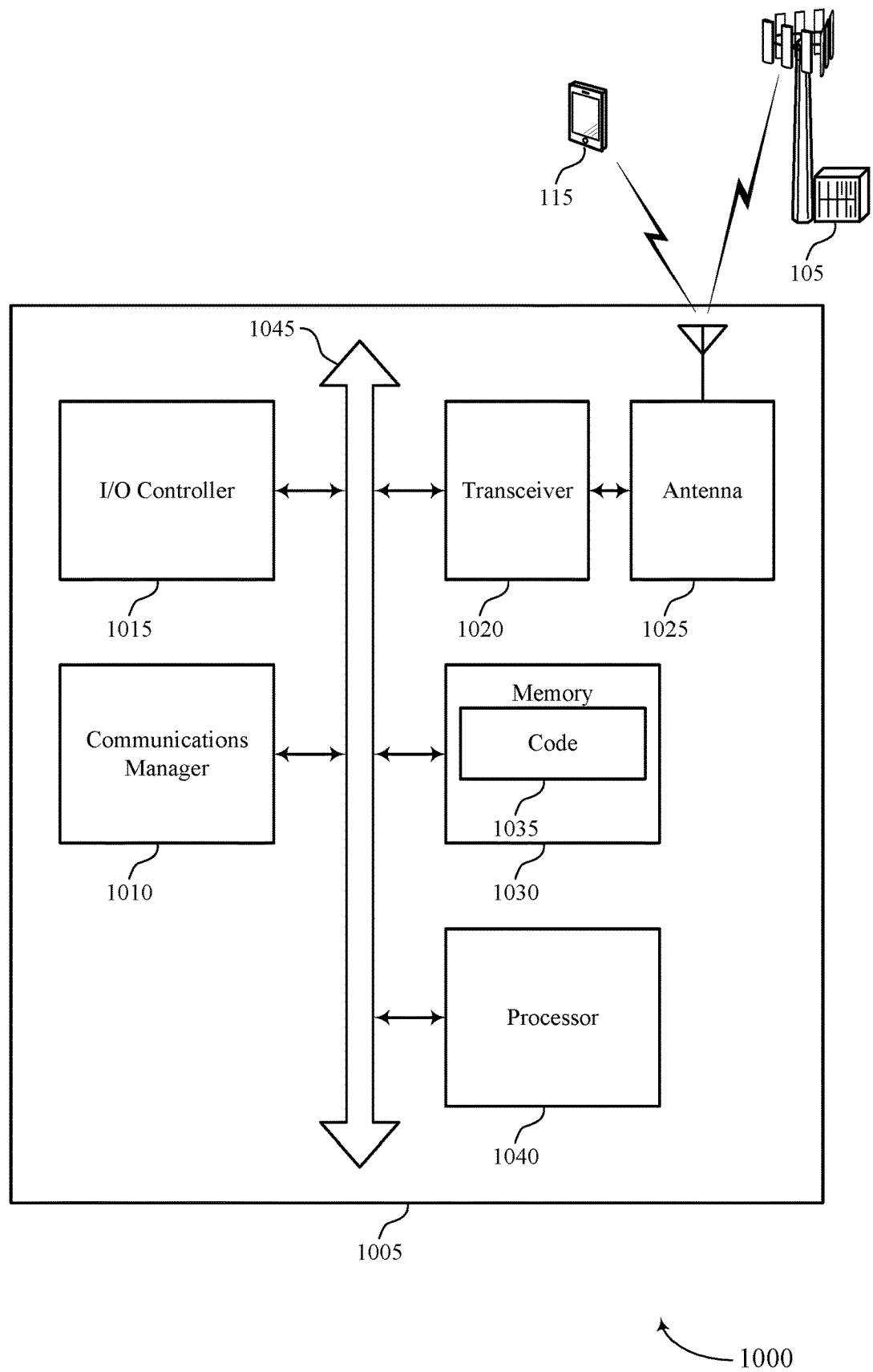
FIG. 10 shows a diagram of a system including a device that supports coded RLC retransmission in accordance with aspects of the present disclosure.

FIG. 10 shows a diagram of a system 1000 including a device 1005 that supports coded RLC retransmission in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify that the UE failed to receive or decode a PDU scheduled to be transmitted by a base station in a broadcast or unicast transmission, transmit, to the base station, a status PDU indicating that the UE failed to receive or decode the PDU, and receive, from the base station and responsive to the status PDU, a repair PDU including redundant bits of the PDU.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting coded RLC retransmission).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
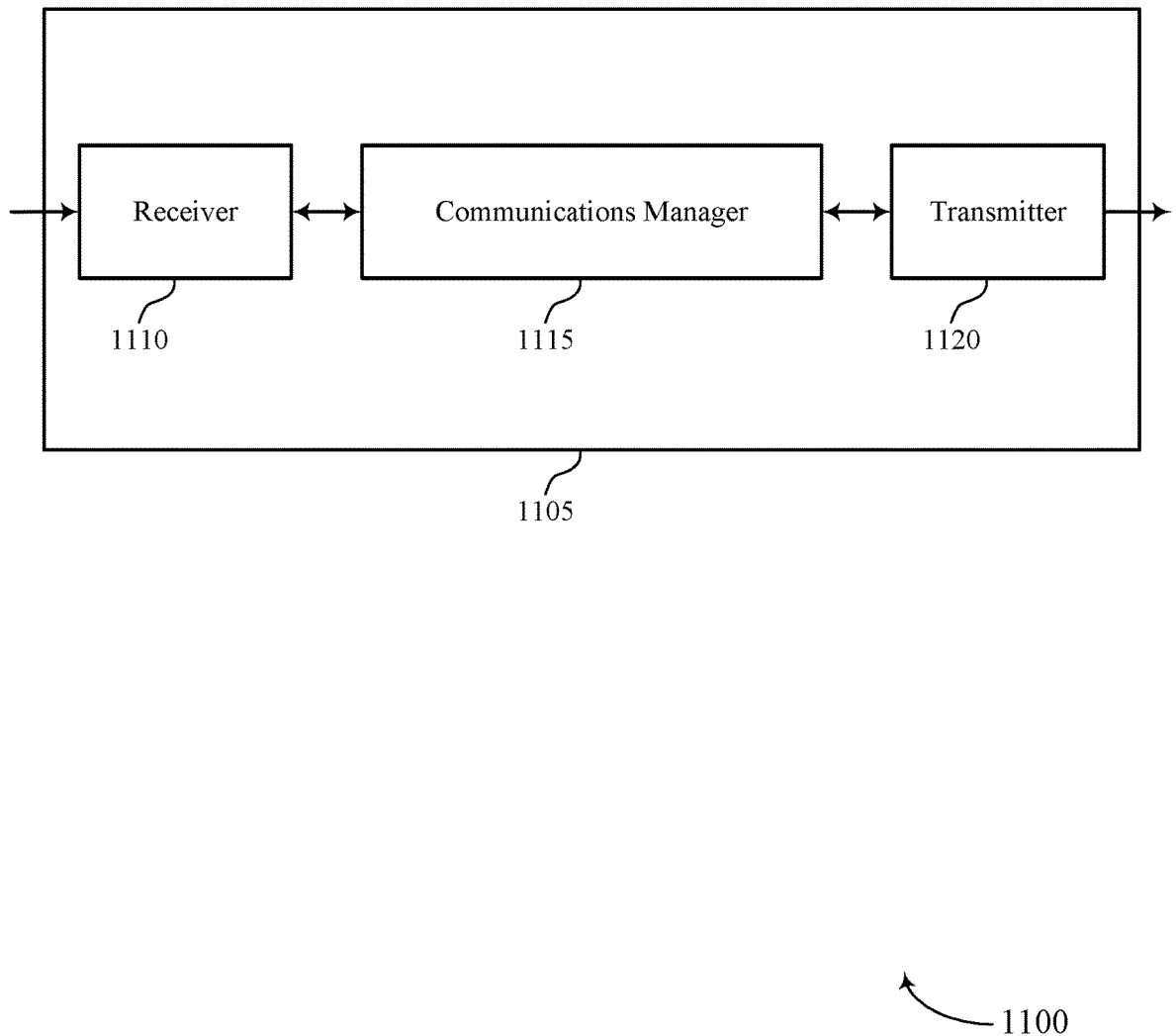
FIGS. 11 and 12 show block diagrams of devices that support coded RLC retransmission in accordance with aspects of the present disclosure.

FIG. 11 shows a block diagram 1100 of a device 1105 that supports coded RLC retransmission in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to coded RLC retransmission, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may generate, at a layer, a PDU for a broadcast or unicast transmission, transmit the PDU in the broadcast or unicast transmission, receive, from a UE, a status PDU indicating that the UE failed to receive or decode the PDU, and transmit a repair PDU including redundant bits of the PDU based on receiving the status PDU. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
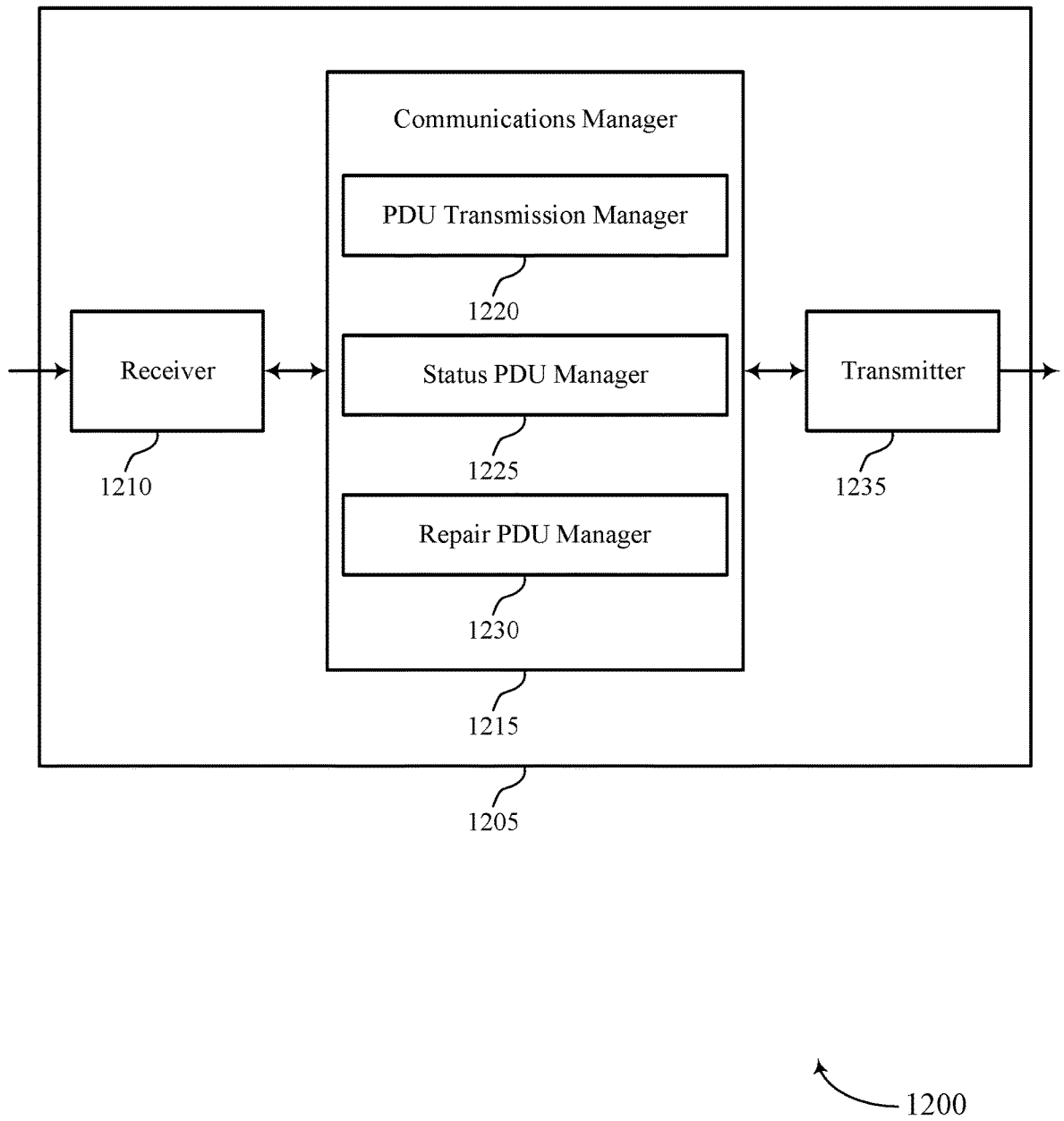

FIG. 12 shows a block diagram 1200 of a device 1205 that supports coded RLC retransmission in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to coded RLC retransmission, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a PDU transmission manager 1220, a status PDU manager 1225, and a repair PDU manager 1230. The communications manager 1215 may be an example of aspects of the communications manager 1410 described herein.

The PDU transmission manager 1220 may generate, at a layer, a PDU for a broadcast or unicast transmission and transmit the PDU in the broadcast or unicast transmission.

The status PDU manager 1225 may receive, from a UE, a status PDU indicating that the UE failed to receive or decode the PDU. The repair PDU manager 1230 may transmit a repair PDU including redundant bits of the PDU based on receiving the status PDU.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
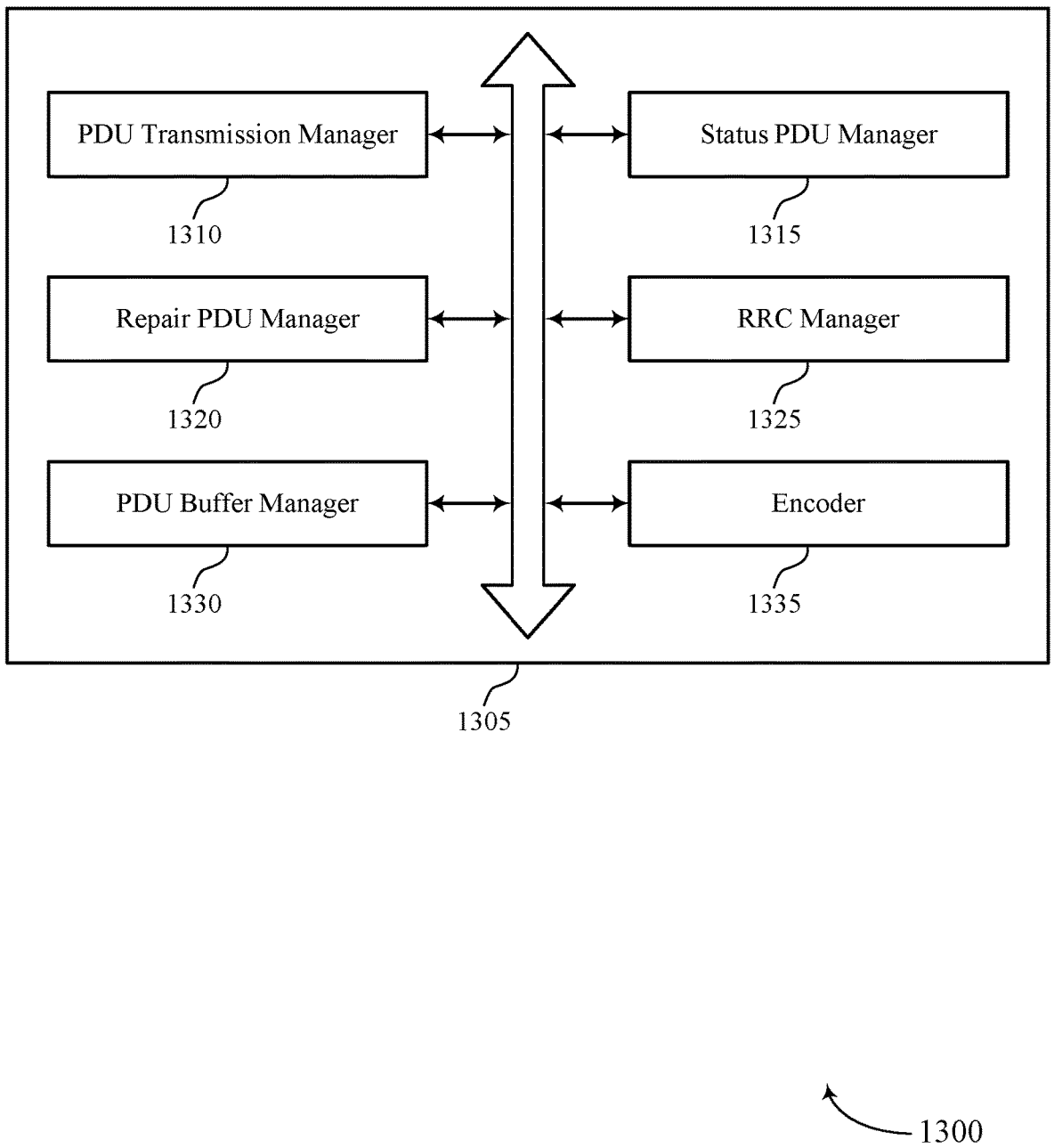
FIG. 13 shows a block diagram of a communications manager that supports coded RLC retransmission in accordance with aspects of the present disclosure.

FIG. 13 shows a block diagram 1300 of a communications manager 1305 that supports coded RLC retransmission in accordance with aspects of the present disclosure. The communications manager 1305 may be an example of aspects of a communications manager 1115, a communications manager 1215, or a communications manager 1410 described herein. The communications manager 1305 may include a PDU transmission manager 1310, a status PDU manager 1315, a repair PDU manager 1320, a RRC manager 1325, a PDU buffer manager 1330, and an encoder 1335. Each of these modules may communicate, directly or indirectly, with one another (e.g., via one or more buses).

The PDU transmission manager 1310 may generate, at a layer, a PDU for a broadcast or unicast transmission. In some examples, the PDU transmission manager 1310 may transmit the PDU in the broadcast or unicast transmission. The status PDU manager 1315 may receive, from a UE, a status PDU indicating that the UE failed to receive or decode the PDU. The repair PDU manager 1320 may transmit a repair PDU including redundant bits of the PDU based on receiving the status PDU.

In some examples, the status PDU manager 1315 may receive, from a set of UEs including the UE, a set of status PDUs indicating that the set of UEs failed to receive or decode a set of PDUs, where the repair PDU includes redundant bits of the set of PDUs. In some examples, the repair PDU manager 1320 may transmit, in the repair PDU, an indication of a range of sequence numbers of the set of PDUs for which redundant bits are included in the repair PDU.

The RRC manager 1325 may transmit, to the UE, radio resource control signaling indicating a maximum number of PDUs or bytes that the UE is configured to store in a buffer. The PDU buffer manager 1330 may determine the maximum number of PDUs or bytes that the UE is configured to store in the buffer based on a delay budget, a forward error correction capability of the UE, a size of the buffer at the UE, or a combination thereof. The encoder 1335 may generate the redundant bits of the PDU using a forward error correction encoder. In some examples, the RRC manager 1325 may transmit, to the UE, radio resource control signaling indicating the forward error correction encoder used to generate the redundant bits included in the repair PDU.

In some examples, the status PDU manager 1315 may receive another status PDU indicating that the UE successfully decoded the PDU using the redundant bits of the PDU included in the repair PDU. In some examples, the status PDU manager 1315 may receive another status PDU indicating that the UE failed to decode the PDU using the redundant bits of the PDU included in the repair PDU. In some examples, the repair PDU manager 1320 may transmit another repair PDU including additional redundant bits of the PDU based on receiving the other status PDU.

In some examples, the PDU transmission manager 1310 may unicast the PDU to the UE. In some examples, the PDU transmission manager 1310 may broadcast a set of PDUs to be received by a set of UEs, the set of PDUs including the protocol data to be received by the UE. In some examples, the repair PDU manager 1320 may unicast the repair PDU to the UE. In some examples, the repair PDU manager 1320 may broadcast the repair PDU to be received by a set of UEs including the UE. In some examples, the status PDU manager 1315 may identify that the base station received a set of status PDUs from the set of UEs indicating that the set of UEs failed to receive or decode a set of PDUs, and the repair PDU manager 1320 may broadcast the repair PDU to be received by the set of UEs based on the identifying.

In some examples, the status PDU manager 1315 may identify that the base station received the status PDU from the UE and that the base station failed to receive other status PDUs from other UEs, and the repair PDU manager 1320 may unicast the repair PDU to the UE based on the identifying. In some cases, the repair PDU includes a control PDU or a data PDU. In some cases, the PDU includes an RLC PDU and the status PDU includes an RLC status PDU. In some cases, the PDU includes a packet data convergence protocol PDU, and the status PDU includes a packet data convergence protocol status report.

Figure 14:
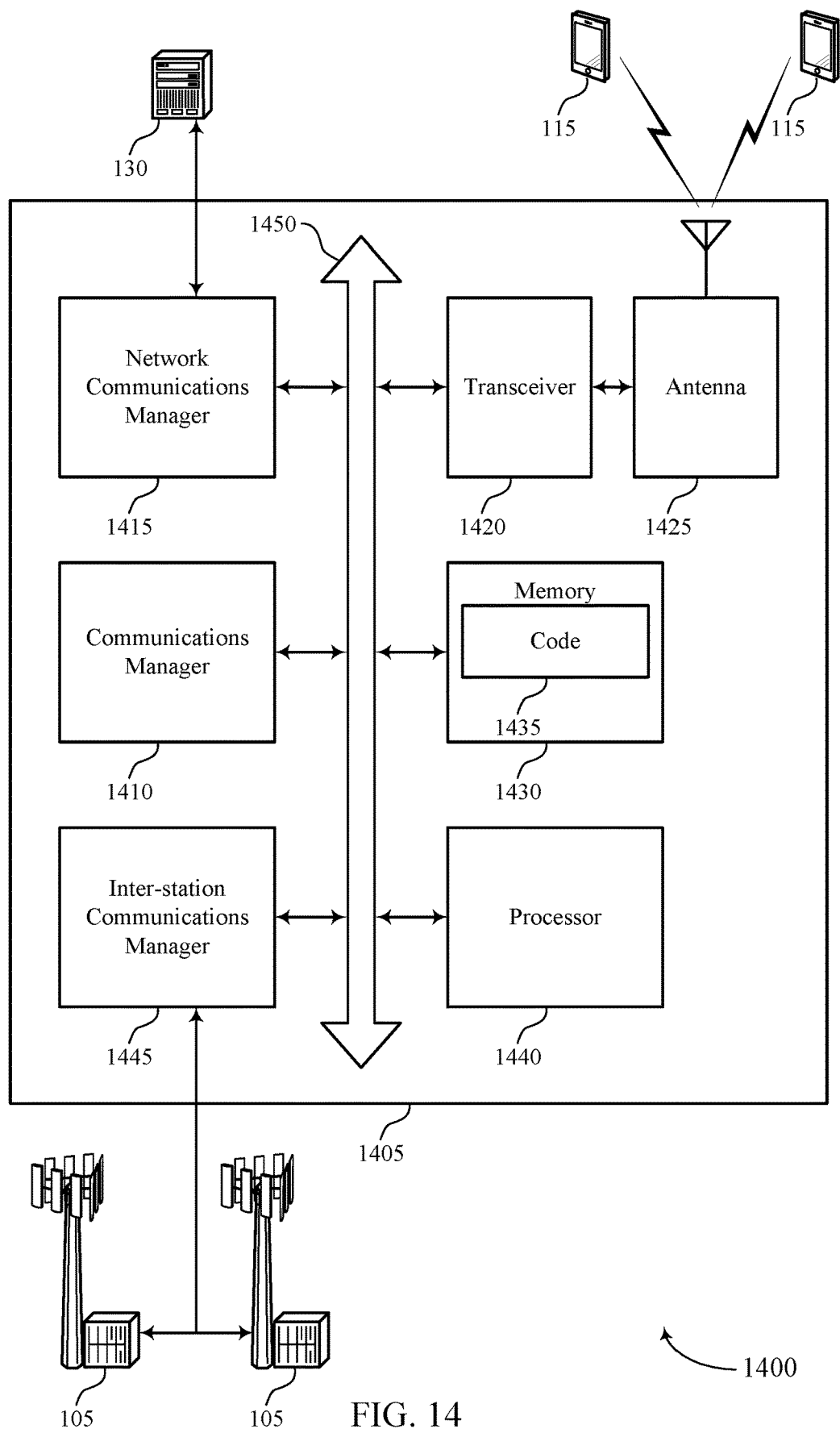
FIG. 14 shows a diagram of a system including a device that supports coded RLC retransmission in accordance with aspects of the present disclosure.

FIG. 14 shows a diagram of a system 1400 including a device 1405 that supports coded RLC retransmission in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may generate, at a layer, a PDU for a broadcast or unicast transmission, transmit the PDU in the broadcast or unicast transmission, receive, from a UE, a status PDU indicating that the UE failed to receive or decode the PDU, and transmit a repair PDU including redundant bits of the PDU based on receiving the status PDU.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting coded RLC retransmission).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
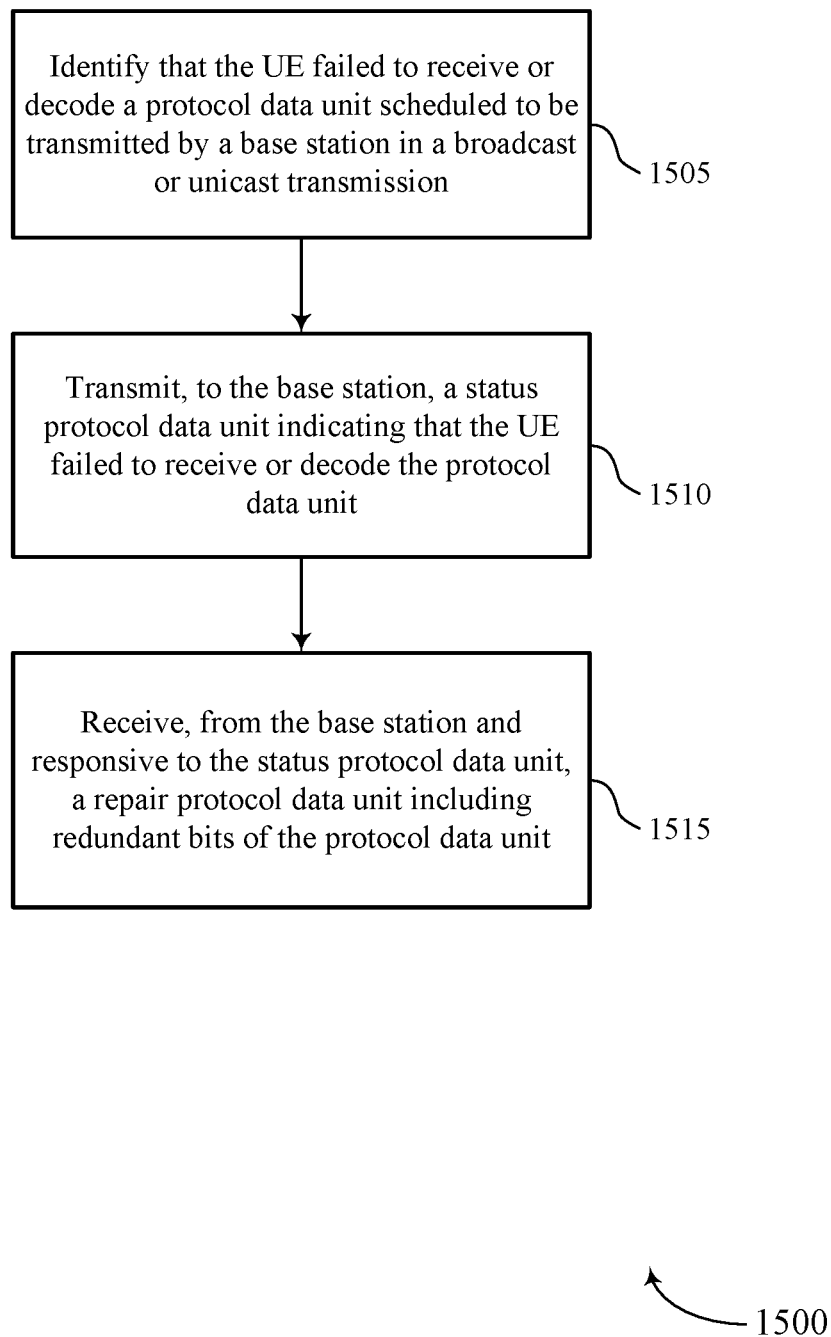
FIGS. 15 and 16 show flowcharts illustrating methods that support coded RLC retransmission in accordance with aspects of the present disclosure.

FIG. 15 shows a flowchart illustrating a method 1500 that supports coded RLC retransmission in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may identify that the UE failed to receive or decode a PDU scheduled to be transmitted by a base station in a broadcast or unicast transmission. The operations of 1505 may be performed according to the methods described herein. In some examples, aspects of the operations of 1505 may be performed by a decoder as described with reference to FIGS. 7 through 10.

At 1510, the UE may transmit, to the base station, a status PDU indicating that the UE failed to receive or decode the PDU. The operations of 1510 may be performed according to the methods described herein. In some examples, aspects of the operations of 1510 may be performed by a status PDU manager as described with reference to FIGS. 7 through 10.

At 1515, the UE may receive, from the base station and responsive to the status PDU, a repair PDU including redundant bits of the PDU. The operations of 1515 may be performed according to the methods described herein. In some examples, aspects of the operations of 1515 may be performed by a repair PDU manager as described with reference to FIGS. 7 through 10.

Figure 16:
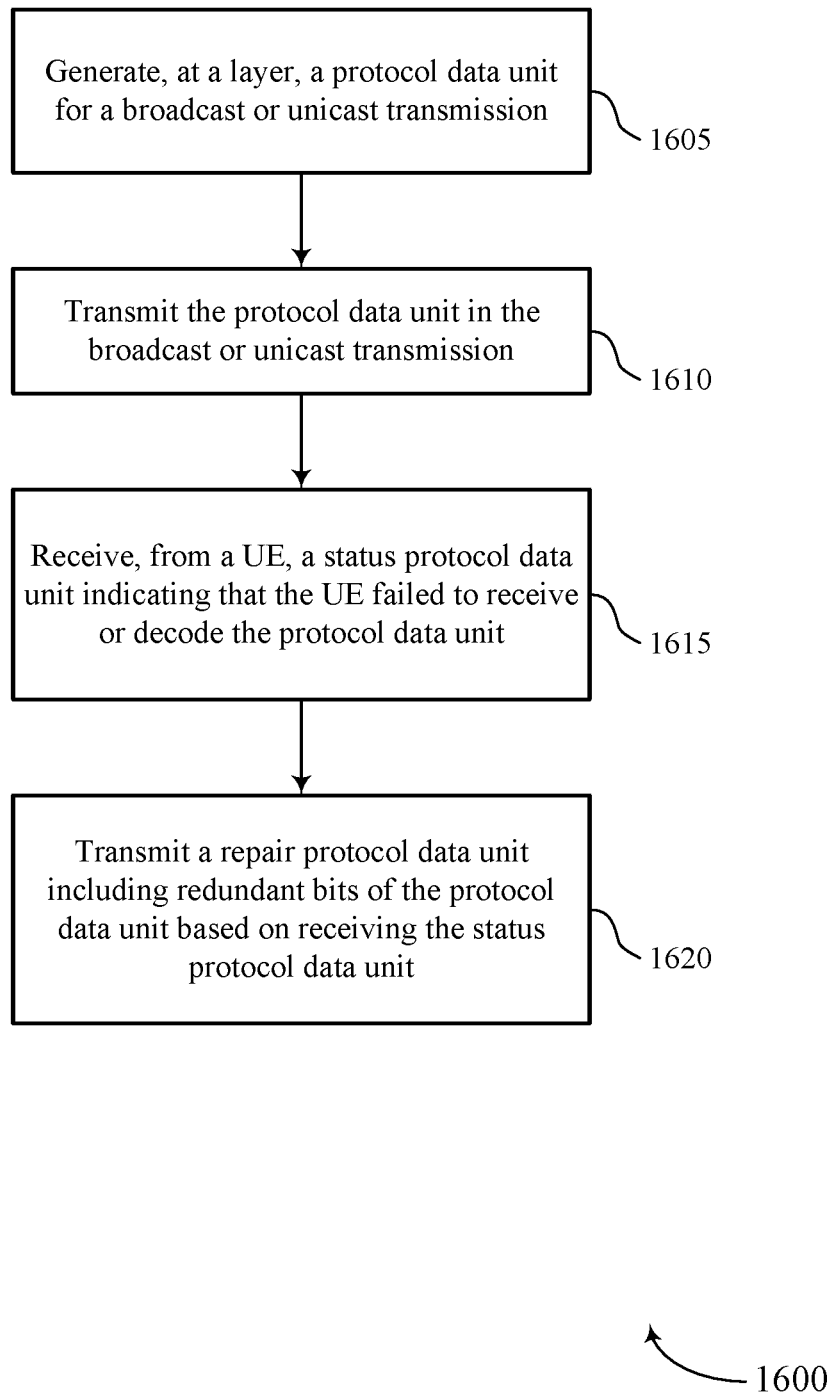

FIG. 16 shows a flowchart illustrating a method 1600 that supports coded RLC retransmission in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may generate, at a layer, a PDU for a broadcast or unicast transmission. The operations of 1605 may be performed according to the methods described herein. In some examples, aspects of the operations of 1605 may be performed by a PDU transmission manager as described with reference to FIGS. 11 through 14.

At 1610, the base station may transmit the PDU in the broadcast or unicast transmission. The operations of 1610 may be performed according to the methods described herein. In some examples, aspects of the operations of 1610 may be performed by a PDU transmission manager as described with reference to FIGS. 11 through 14.

At 1615, the base station may receive, from a UE, a status PDU indicating that the UE failed to receive or decode the PDU. The operations of 1615 may be performed according to the methods described herein. In some examples, aspects of the operations of 1615 may be performed by a status PDU manager as described with reference to FIGS. 11 through 14.

At 1620, the base station may transmit a repair PDU including redundant bits of the PDU based on receiving the status PDU. The operations of 1620 may be performed according to the methods described herein. In some examples, aspects of the operations of 1620 may be performed by a repair PDU manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1

A method for wireless communication at a UE, comprising: identifying that the UE failed to receive or decode a protocol data unit scheduled to be transmitted by a base station in a broadcast or unicast transmission; transmitting, to the base station, a status protocol data unit indicating that the UE failed to receive or decode the protocol data unit; and receiving, from the base station and responsive to the status protocol data unit, a repair protocol data unit comprising redundant bits of the protocol data unit.

Example 2

The method of example 1, further comprising: processing the repair protocol data unit at either a radio link control layer or a packet data convergence protocol layer.

Example 3

The method of example 1 or 2, wherein receiving the repair protocol data unit comprises: receiving the repair protocol data unit via either a broadcast or multicast transmission, wherein the repair protocol data unit includes redundant bits for the UE and for a plurality of other UEs.

Example 4

The method of any one of examples 1 through 3, wherein the repair protocol data unit is associated with a multicast radio bearer.

Example 5

The method of any one of examples 1 through 4, further comprising: storing at least one correctly decoded protocol data unit in a buffer at the UE; and combining the at least one correctly decoded protocol data unit with the redundant bits of the protocol data unit in an attempt to decode at least the protocol data unit that the UE failed to receive or decode.

Example 6

The method of any one of examples 1 through 5, further comprising: receiving radio resource control signaling indicating a maximum number of protocol data units or bytes that the UE is configured to store in the buffer.

Example 7

The method of any one of examples 1 through 6, further comprising: receiving radio resource control signaling indicating a forward error correction encoder used to generate the redundant bits included in the repair protocol data unit.

Example 8

The method of any one of examples 1 through 7, further comprising: successfully decoding the protocol data unit using buffered protocol data units and the redundant bits of the protocol data unit included in the repair protocol data unit; and transmitting another status protocol data unit indicating that the UE successfully decoded the protocol data unit.

Example 9

The method of any one of examples 1 through 8, further comprising: advancing a window of the buffered protocol data units based at least in part on successfully decoding the protocol data unit, wherein the advancing comprises dropping a protocol data unit with a lowest sequence number from a buffer and adding the successfully decoded protocol data unit to the buffer.

Example 10

The method of any one of examples 1 through 9, further comprising: identifying that the UE failed to decode the protocol data unit using buffered protocol data units and the redundant bits of the protocol data unit included in the repair protocol data unit; transmitting another status protocol data unit indicating that the UE failed to decode the protocol data unit; and receiving another repair protocol data unit comprising additional redundant bits of the protocol data unit based at least in part on transmitting the other status protocol data unit.

Example 11

The method of any one of examples 1 through 10, wherein the repair protocol data unit comprises redundant bits of a plurality of protocol data units including the protocol data unit that the UE failed to receive or decode; and wherein the plurality of protocol data units are for one or more UEs including the UE.

Example 12

The method of any one of examples 1 through 11, further comprising: determining a sequence number of the protocol data unit that the UE failed to receive or decode; and identifying the redundant bits of the protocol data unit from the repair protocol data unit based at least in part on the sequence number.

Example 13

The method of any one of examples 1 through 12, wherein the repair protocol data unit indicates a range of sequence numbers of the plurality of protocol data units for which redundant bits are included in the repair protocol data unit.

Example 14

The method of any one of examples 1 through 13, wherein the UE is operating in an RLC AM, an RLC FM, or an RLC BM.

Example 15

The method of any one of examples 1 through 14, wherein the repair protocol data unit comprises a control protocol data unit or a protocol data unit.

Example 16

The method of any one of examples 1 through 15, wherein the protocol data unit comprises a radio link control protocol data unit and the status protocol data unit comprises a radio link control status protocol data unit; or wherein the protocol data unit comprises a PDCP protocol data unit and the status protocol data unit comprises a packet data convergence protocol status report.

Example 17

A method for wireless communication at a base station, comprising: generating, at a layer, a protocol data unit for a broadcast or unicast transmission; transmitting the protocol data unit in the broadcast or unicast transmission; receiving, from a UE, a status protocol data unit indicating that the UE failed to receive or decode the protocol data unit; and transmitting a repair protocol data unit comprising redundant bits of the protocol data unit based at least in part on receiving the status protocol data unit.

Example 18

The method of example 17, further comprising: generating the repair protocol data unit at either a radio link control layer or a packet data convergence protocol layer.

Example 19

The method of example 17 or 18, wherein transmitting the repair protocol data unit comprises: transmitting the repair protocol data unit via either a broadcast or multicast transmission, wherein the repair protocol data unit includes redundant bits for the UE and for a plurality of other UEs.

Example 20

The method of any one of examples 17 through 19, wherein the repair protocol data unit is associated with a multicast radio bearer.

Example 21

The method of any one of examples 17 through 20, wherein receiving the status protocol data unit comprises: receiving, from a plurality of UEs including the UE, a plurality of status protocol data units indicating that the plurality of UEs failed to receive or decode a plurality of protocol data units, wherein the repair protocol data unit comprises redundant bits of the plurality of protocol data units.

Example 22

The method of any one of examples 17 through 21, further comprising: transmitting, in the repair protocol data unit, an indication of a range of sequence numbers of the plurality of protocol data units for which redundant bits are included in the repair protocol data unit.

Example 23

The method of any one of examples 17 through 22, further comprising: transmitting, to the UE, radio resource control signaling indicating a maximum number of protocol data units or bytes that the UE is configured to store in a buffer.

Example 24

The method of any one of examples 17 through 23, further comprising: determining the maximum number of protocol data units or bytes that the UE is configured to store in the buffer based at least in part on a delay budget, a forward error correction capability of the UE, a size of the buffer at the UE, or a combination thereof.

Example 25

The method of any one of examples 17 through 24, further comprising: generating the redundant bits of the protocol data unit using a forward error correction encoder.

Example 26

The method of any one of examples 17 through 25, further comprising: transmitting, to the UE, radio resource control signaling indicating the forward error correction encoder used to generate the redundant bits included in the repair protocol data unit.

Example 27

The method of any one of examples 17 through 26, further comprising: receiving another status protocol data unit indicating that the UE successfully decoded the protocol data unit using the redundant bits of the protocol data unit included in the repair protocol data unit.

Example 28

The method of any one of examples 17 through 27, further comprising: receiving another status protocol data unit indicating that the UE failed to decode the protocol data unit using the redundant bits of the protocol data unit included in the repair protocol data unit; and transmitting another repair protocol data unit comprising additional redundant bits of the protocol data unit based at least in part on receiving the other status protocol data unit.

Example 29

The method of any one of examples 17 through 28, wherein transmitting the protocol data unit comprises: unicasting the protocol data unit to the UE; or broadcasting a plurality of protocol data units to be received by a plurality of UEs, the plurality of protocol data units comprising the protocol data to be received by the UE.

Example 30

The method of any one of examples 17 through 29, wherein transmitting the repair protocol data unit comprises: unicasting the repair protocol data unit to the UE; or broadcasting the repair protocol data unit to be received by a plurality of UEs including the UE.

Example 31

The method of any one of examples 17 through 30, further comprising: identifying that the base station received a plurality of status protocol data units from the plurality of UEs indicating that the plurality of UEs failed to receive or decode a plurality of protocol data units; and broadcasting the repair protocol data unit to be received by the plurality of UEs based at least in part on the identifying.

Example 32

The method of any one of examples 17 through 31, further comprising: identifying that the base station received the status protocol data unit from the UE and that the base station failed to receive other status protocol data units from other UEs; and unicasting the repair protocol data unit to the UE based at least in part on the identifying.

Example 33

The method of any one of examples 17 through 32, wherein the repair protocol data unit comprises a control protocol data unit or a data protocol data unit.

Example 34

The method of any one of examples 17 through 33, wherein: the protocol data unit comprises a radio link control protocol data unit and the status protocol data unit comprises a radio link control status protocol data unit; or wherein the protocol data unit comprises a PDCP protocol data unit and the status protocol data unit comprises a packet data convergence protocol status report.

Example 35

An apparatus comprising at least one means for performing a method of any of examples 1 to 16.

Example 36

An apparatus comprising at least one means for performing a method of any of examples 17 to 34.

Example 37

An apparatus for wireless communications comprising a processor; memory coupled with the processor; and instructions stored in the memory and executable by the processor to cause the apparatus to perform a method of any of examples 1 to 16.

Example 38

An apparatus for wireless communications comprising a processor; memory coupled with the processor; and instructions stored in the memory and executable by the processor to cause the apparatus to perform a method of any of examples 17 to 34.

Example 39

A non-transitory computer-readable medium storing code for wireless communications, the code comprising instructions executable by a processor to perform a method of any of examples 1 to 16.

Example 40

A non-transitory computer-readable medium storing code for wireless communications, the code comprising instructions executable by a processor to perform a method of any of examples 17 to 34.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving radio resource control signaling from a network entity indicating a number of protocol data units that the UE is configured to store in a buffer at the UE for decoding lost protocol data units;
   identifying that the UE failed to receive or decode a protocol data unit scheduled to be transmitted in a broadcast or unicast transmission;
   transmitting, to the network entity, a status protocol data unit indicating that the UE failed to receive or decode the protocol data unit;
   receiving, from the network entity and responsive to the status protocol data unit, a repair protocol data unit comprising redundant bits of a plurality of protocol data units including the protocol data unit that the UE failed to receive or decode, the repair protocol data unit indicating a range of sequence numbers of the plurality of protocol data units for which redundant bits are included in the repair protocol data unit; and
   combining at least one correctly decoded protocol data unit stored in the buffer with the redundant bits of the protocol data unit in an attempt to decode at least the protocol data unit that the UE failed to receive or decode.

2. The method of claim 1, further comprising:
   processing the repair protocol data unit at either a radio link control layer or a packet data convergence protocol layer.

3. The method of claim 1, wherein receiving the repair protocol data unit comprises:
   receiving the repair protocol data unit via either a broadcast or multicast transmission.

4. The method of claim 1, wherein the repair protocol data unit is associated with a multicast radio bearer.

5. The method of claim 1, further comprising:
   successfully decoding the protocol data unit using buffered protocol data units and the redundant bits of the protocol data unit included in the repair protocol data unit; and
   transmitting another status protocol data unit indicating that the UE successfully decoded the protocol data unit.

6. The method of claim 5, further comprising:
advancing a window of the buffered protocol data units based at least in part on successfully decoding the protocol data unit, wherein the advancing comprises dropping a protocol data unit with a lowest sequence number from a buffer and adding the successfully decoded protocol data unit to the buffer.

7. The method of claim 1, further comprising:
identifying that the UE failed to decode the protocol data unit using buffered protocol data units and the redundant bits of the protocol data unit included in the repair protocol data unit;
transmitting a second status protocol data unit indicating that the UE failed to decode the protocol data unit; and
receiving another repair protocol data unit comprising additional redundant bits of the protocol data unit based at least in part on transmitting the second status protocol data unit.

8. The method of claim 1, further comprising:
determining a sequence number of the protocol data unit that the UE failed to receive or decode; and
identifying the redundant bits of the protocol data unit from the repair protocol data unit based at least in part on the sequence number.

9. The method of claim 1, wherein the UE is operating in a radio link control acknowledged mode (RLC AM), a radio link control forward error correction mode (RLC FM), or a radio link control broadcast mode (RLC BM).

10. The method of claim 1, wherein the repair protocol data unit comprises a control protocol data unit or a data protocol data unit.

11. The method of claim 1, wherein:
the protocol data unit comprises a radio link control protocol data unit and the status protocol data unit comprises a radio link control status protocol data unit; or
the protocol data unit comprises a packet data convergence protocol protocol data unit and the status protocol data unit comprises a packet data convergence protocol status report.

12. A method for wireless communication at a network entity, comprising:
transmitting, to a user equipment (UE), radio resource control signaling indicating a number of protocol data units that the UE is configured to store in a buffer at the UE for decoding lost protocol data units;
generating, at a layer, a protocol data unit for a broadcast or unicast transmission;
transmitting the protocol data unit in the broadcast or unicast transmission;
receiving a status protocol data unit indicating that the UE failed to receive or decode the protocol data unit; and
transmitting a repair protocol data unit comprising redundant bits of a plurality of protocol data units including the protocol data unit that the UE failed to receive or decode based at least in part on receiving the status protocol data unit, wherein the repair protocol data unit indicating a range of sequence numbers of the plurality of protocol data units for which redundant bits are included in the repair protocol data unit.

13. The method of claim 12, further comprising:
generating the repair protocol data unit at either a radio link control layer or a packet data convergence protocol layer.

14. The method of claim 12, wherein transmitting the repair protocol data unit comprises:
transmitting the repair protocol data unit via either a broadcast or multicast transmission.

15. The method of claim 12, wherein the repair protocol data unit is associated with a multicast radio bearer.

16. The method of claim 12, wherein receiving the status protocol data unit comprises:
receiving, from a plurality of UEs including the UE, a plurality of status protocol data units indicating that the plurality of UEs failed to receive or decode a plurality of protocol data units, wherein the repair protocol data unit comprises redundant bits of the plurality of protocol data units.

17. The method of claim 12, further comprising:
determining the number of protocol data units that the UE is configured to store in the buffer based at least in part on a delay budget, a forward error correction capability of the UE, a size of the buffer at the UE, or a combination thereof.

18. The method of claim 12, further comprising:
generating the redundant bits of the protocol data unit using a forward error correction encoder.

19. The method of claim 12, further comprising:
receiving a second status protocol data unit indicating that the UE failed to decode the protocol data unit using the redundant bits of the protocol data unit included in the repair protocol data unit; and
transmitting another repair protocol data unit comprising additional redundant bits of the protocol data unit based at least in part on receiving the second status protocol data unit.

20. The method of claim 12, wherein transmitting the protocol data unit comprises:
unicasting the protocol data unit to the UE; or
broadcasting a plurality of protocol data units to be received by a plurality of UEs, the plurality of protocol data units comprising the protocol data unit to be received by the UE.

21. The method of claim 12, wherein transmitting the repair protocol data unit comprises:
unicasting the repair protocol data unit to the UE; or
broadcasting the repair protocol data unit to be received by a plurality of UEs including the UE.

22. The method of claim 12, wherein:
the protocol data unit comprises a radio link control protocol data unit and the status protocol data unit comprises a radio link control status protocol data unit; or
the protocol data unit comprises a packet data convergence protocol data unit and the status protocol data unit comprises a packet data convergence protocol status report.

23. An apparatus for wireless communication at a user equipment (UE), comprising:
at least one processor; and
at least one memory coupled with the at least one processor, with instructions stored in the at least one memory, the instructions being executable by the at least one processor to cause the apparatus to:
receive radio resource control signaling indicating a number of protocol data units that the UE is configured to store in a buffer at the UE for decoding lost protocol data units;
identify that the UE failed to receive or decode a protocol data unit scheduled to be transmitted by a network entity in a broadcast or unicast transmission;

transmit, to the network entity, a status protocol data unit indicating that the UE failed to receive or decode the protocol data unit;

receive, from the network entity and responsive to the status protocol data unit, a repair protocol data unit comprising redundant bits of a plurality of protocol data units including the protocol data unit that the UE failed to receive or decode, the repair protocol data unit indicating a range of sequence numbers of the plurality of protocol data units for which redundant bits are included in the repair protocol data unit; and combining at least one correctly decoded protocol data unit stored in the buffer with the redundant bits of the protocol data unit in an attempt to decode at least the protocol data unit that the UE failed to receive or decode.

24. An apparatus for wireless communication at a network entity, comprising:

at least one processor; and at least one memory coupled with the at least one processor, with instructions stored in the at least one memory, the instructions being executable by the at least one processor to cause the apparatus to:

transmit, to a user equipment (UE), radio resource control signaling indicating a number of protocol data units that the UE is configured to store in a buffer at the UE for decoding lost protocol data units;

generate, at a layer, a protocol data unit for a broadcast or unicast transmission;

transmit the protocol data unit in the broadcast or unicast transmission;

receive a status protocol data unit indicating that the UE failed to receive or decode the protocol data unit; and transmit a repair protocol data unit comprising redundant bits of a plurality of protocol data units including the protocol data unit that the UE failed to receive or decode based at least in part on receiving the status protocol data unit, wherein the repair protocol data unit indicating a range of sequence numbers of the plurality of protocol data units for which redundant bits are included in the repair protocol data unit.

* * * * *